(12) United States Patent
Lee et al.

(10) Patent No.: US 11,231,842 B2
(45) Date of Patent: Jan. 25, 2022

(54) METHOD FOR CHANGING THE SIZE OF THE CONTENT DISPLAYED ON DISPLAY AND ELECTRONIC DEVICE THEREOF

(71) Applicant: Samsung Electronics Co., Ltd., Suwon-si (KR)

(72) Inventors: Yoon-Woo Lee, Paju-si (KR); Sungboo Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 16/003,689

(22) Filed: Jun. 8, 2018

(65) Prior Publication Data

US 2019/0065035 A1    Feb. 28, 2019

(30) Foreign Application Priority Data

Aug. 22, 2017  (KR) .................. 10-2017-0106117

(51) Int. Cl.
*G06F 3/0484*    (2013.01)
*G06F 3/0485*    (2013.01)
*G06F 3/0488*    (2013.01)

(52) U.S. Cl.
CPC ........ *G06F 3/04845* (2013.01); *G06F 3/0485* (2013.01); *G06F 3/0488* (2013.01); *G06F 3/04883* (2013.01); *G06F 2203/04806* (2013.01)

(58) Field of Classification Search
CPC .. G06F 3/0484; G06F 3/04845; G06F 3/0485; G06F 3/04806; G06F 3/0488; G06F 3/04883
See application file for complete search history.

(56) References Cited

U.S. PATENT DOCUMENTS 5,815,151 A * 9/1998 Argiolas ............... G06F 3/0481
                                                          715/800
9,519,729 B2   12/2016 Rohrabaugh et al.
(Continued)

FOREIGN PATENT DOCUMENTS

JP    2008-140361 A    6/2008
KR    10-2014-0082434 A    7/2014
KR    10-2015-0049716 A    5/2015

OTHER PUBLICATIONS

International Search Report dated Oct. 29, 2018, issued in International Application No. PCT/KR2018/007619, 7 pages.
(Continued)

*Primary Examiner* — Kavita Stanley
*Assistant Examiner* — William Wong
(74) *Attorney, Agent, or Firm* — Jefferson IP Law, LLP

(57) ABSTRACT

An apparatus and method for changing a size of content in an electronic device are provided. The method includes displaying a user interface including web content in such a manner that a second object including the web content is located in a first object, receiving a user input for zooming in or out the web content with a first magnification, zooming in or out the web content with the first magnification in the second object, of which a magnification is selected to be greater than the first magnification, irrespective of the first magnification on the a basis of reception of the user input, and adjusting the second object to have the first magnification after zooming in or out the web content with the first magnification. The first object is included in a first view class which allows the second object located in the first object to be scrolled.

16 Claims, 20 Drawing Sheets

(56) References Cited

U.S. PATENT DOCUMENTS

| | | | |
|---|---|---|---|
| 9,678,571 B1* | 6/2017 | Robert | G06F 3/0485 |
| 10,220,301 B1* | 3/2019 | Khanna | A63F 13/00 |
| 2002/0000998 A1* | 1/2002 | Scott | G06T 3/4084 |
| | | | 345/667 |
| 2007/0157160 A1* | 7/2007 | Arend | G06F 3/048 |
| | | | 717/105 |
| 2008/0134070 A1* | 6/2008 | Kobayashi | G06F 3/0481 |
| | | | 715/767 |
| 2009/0109243 A1* | 4/2009 | Kraft | G06F 3/0488 |
| | | | 345/660 |
| 2009/0144644 A1 | 6/2009 | Chaudhri et al. | |
| 2010/0058254 A1* | 3/2010 | Narita | G06F 3/0481 |
| | | | 715/863 |
| 2010/0302281 A1* | 12/2010 | Kim | G06F 3/04845 |
| | | | 345/661 |
| 2012/0044267 A1* | 2/2012 | Fino | G06F 40/109 |
| | | | 345/667 |
| 2013/0027408 A1* | 1/2013 | Garg | G06F 16/9577 |
| | | | 345/473 |
| 2013/0120460 A1* | 5/2013 | Adams | G06F 3/0485 |
| | | | 345/660 |
| 2013/0268446 A1* | 10/2013 | Buschmann | G06Q 30/01 |
| | | | 705/304 |
| 2014/0059457 A1 | 2/2014 | Min | |
| 2014/0062917 A1 | 3/2014 | Seo et al. | |
| 2014/0085237 A1* | 3/2014 | Choi | G06F 3/04883 |
| | | | 345/173 |
| 2014/0095362 A1* | 4/2014 | Friedholm | G06Q 30/04 |
| | | | 705/34 |
| 2014/0181734 A1 | 6/2014 | Jin | |
| 2014/0267115 A1 | 9/2014 | Jeon et al. | |
| 2015/0035772 A1* | 2/2015 | Asahara | G01S 7/22 |
| | | | 345/173 |
| 2015/0370912 A1 | 12/2015 | Liang et al. | |
| 2016/0259530 A1* | 9/2016 | Everitt | G06F 3/04847 |
| 2017/0123635 A1* | 5/2017 | Zhang | G06F 3/0488 |
| 2017/0357317 A1* | 12/2017 | Chaudhri | G06F 3/016 |
| 2018/0069983 A1* | 3/2018 | Cho | G06F 3/0481 |

OTHER PUBLICATIONS

Call removeView() on the child's parent first, https://stackoverflow.com/questions/6526874/call-removeview-on-the-childs-parent-first, 2018, 3 pages.
Handling Scrolls with CoordinatorLayout, https://github.com/codepath/android_guides/wiki/Handling-Scrolls-with-CoordinatorLayout, 2018, 13 pages.
Extended European Search Report dated Jul. 27, 2020, issued in European Patent Application No. 18847977.8.
Korean Office Action dated Jul. 29, 2021, issued in Korean Patent Application No. 10-2017-0106117.

* cited by examiner

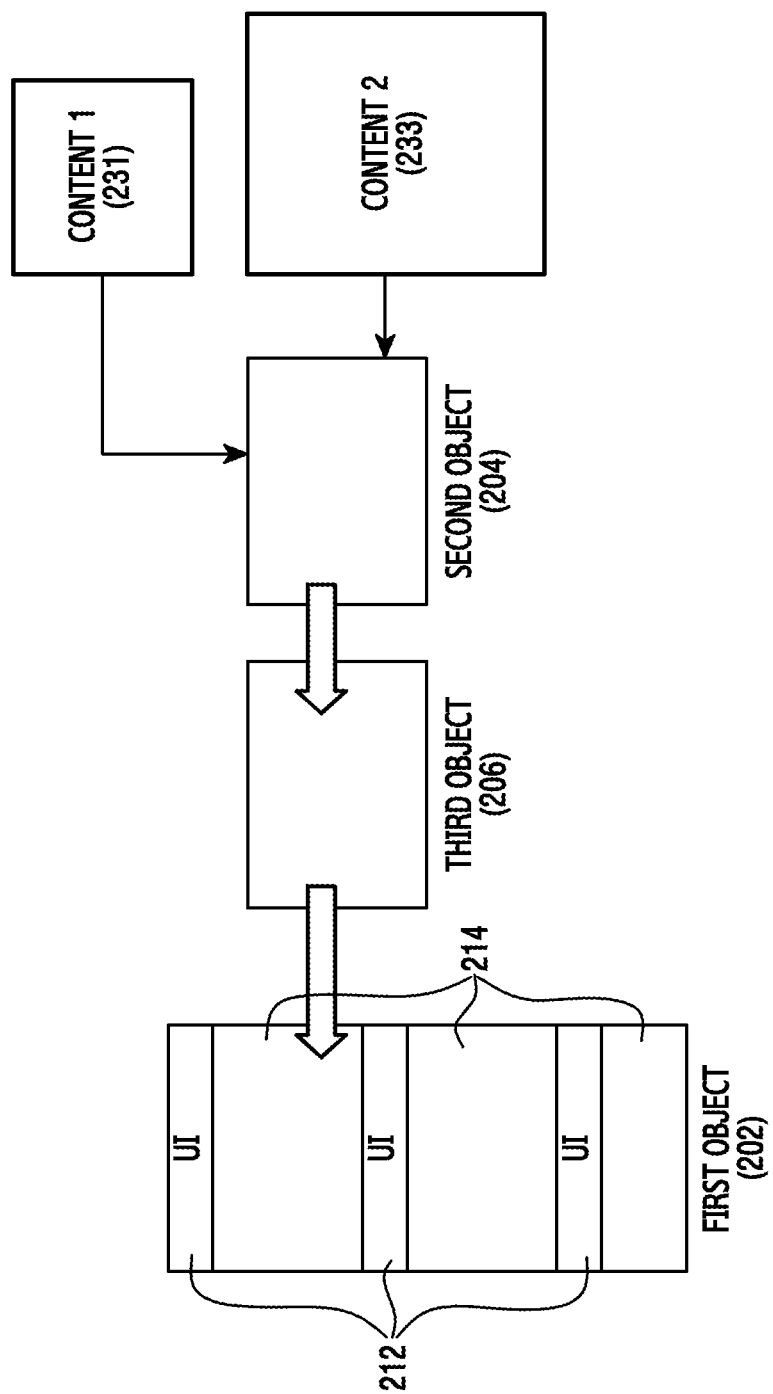

METHOD FOR CHANGING THE SIZE OF THE CONTENT DISPLAYED ON DISPLAY AND ELECTRONIC DEVICE THEREOF

CROSS REFERENCE TO RELATED APPLICATION(S)

This application is based on and claims priority under 35 U.S.C. § 119 of a Korean patent application number 10-2017-0106117, filed on Aug. 22, 2017, in the Korean Intellectual Property Office, the disclosure of which is incorporated by reference herein in its entirety.

BACKGROUND

1. Field

The disclosure relates to an apparatus and method for adjusting a content display region of a display device. More particularly, the disclosure relates to a change in a size of content in an electronic device.

2. Description of the Related Art

With the advance of information communication techniques and semiconductor techniques, a variety of electronic devices are being developed into devices for providing various functions. For example, the various functions may include functions of a voice call, a message, a camera, or the like and functions of a broadcasting service, a wireless Internet service, an electronic payment service, a smart key service, or the like.

The electronic device may provide a variety of content to a user through the various functions. For example, as digital information delivered through a variety of wired/wireless networks, the content may include web content (e.g., hypertext markup language (HTML) content, etc.), media content, game content, or the like. The electronic device may configure a layout for displaying content required by a user. For example, upon displaying the content, the electronic device may display a user interface (UI) in at least one of upper and lower regions of the content by using an additional region (i.e., a dummy space) in addition to the content.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for changing a size of content displayed on a display device in an electronic device.

When an electronic device displays content, up to an additional region in which a user interface is displayed may be recognized as a region of the content. Accordingly, when the electronic device zooms in the content displayed on a display device, it may be extended to up to an additional region for displaying a user interface, resulting in an unnecessary space.

Additional aspects will be set forth in part in the description which follows and, in part, will be apparent from the description, or may be learned by practice of the presented embodiments.

In accordance with an aspect of the disclosure, an electronic device is provided. The electronic device includes a touch screen display, at least one processor electrically coupled to the display, and a memory electrically coupled to the at least one processor and configured to store instructions. The memory is further configured to store a first object located in a first view class which allows a second object located in the first object to be scrolled in the touch screen display, and the second object is included in a second view class. When executed, the stored instructions configure the at least one processor to display a user interface including web content through the touch screen display in such a manner that the second object including the web content is located in the first object, receive a user input for zooming in or zooming out the web content with a first magnification, zoom in or zoom out the web content with the first magnification in the second object of a selected magnification is greater than the first magnification upon receiving the user input, and adjust the second object to have the first magnification after zooming in or zooming out the web content with the first magnification.

In accordance with another aspect of the disclosure, a method of operating an electronic device is provided. The method includes displaying a user interface including web content on a touch screen display of the electronic device in such a manner that a second object including the web content is located in a first object, receiving a user input for zooming in or zooming out the web content with a first magnification, zooming in or zooming out the web content with the first magnification in the second object of a selected magnification is greater than the first magnification upon receiving the user input, and adjusting the second object to have the first magnification after zooming in or zooming out the web content with the first magnification.

In accordance with another aspect of the disclosure, an electronic device is provided. The electronic device includes a display, a memory, and at least one processor coupled to the memory. When executed, the stored instructions configure the at least one processor to display content through the display in such a manner that a second object including the content is located in a first object, receive an input for changing a size of the content, changing the size of the content, based on the input, and change a size corresponding to the second object, based on the changed size of the content, in the first object.

In an electronic device and an operating method thereof according to various embodiments, a size of content depending on a user input is changed in a first object of a first view class, which includes a second object of at least one view class for rendering the content, thereby capable of preventing an unnecessary space and freely changing the size of the content.

In an electronic device and an operating method thereof according to various embodiments, a size of a second object created through at least one second view class for rendering content is extended to a virtual region to restrict occurrence of a scroll of the second object, thereby capable of preventing screen shaking caused by a change in a size of the content and increasing visibility of a user for the content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspect, features, and advantages of certain embodiments of the disclosure will be more apparent of the following description taken in conjunction with the accompanying drawings, in which:

FIGS. 2A and 2B illustrate a structure of a processor for updating a content display region according to various embodiments of the disclosure;

Through the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
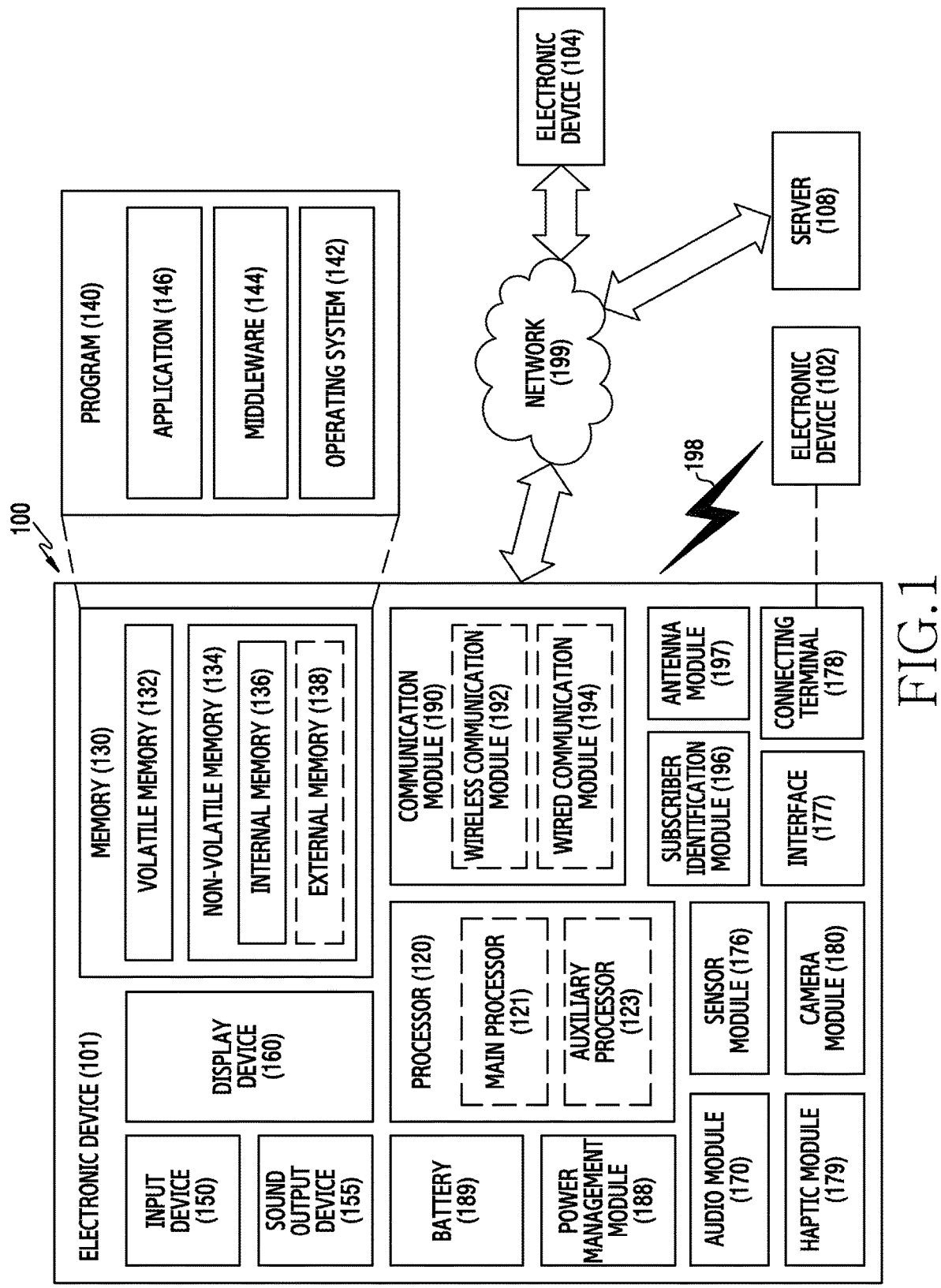
FIG. 1 illustrates a block diagram of an electronic device in a network environment for updating a content display region according to various embodiments of the disclosure.

FIG. 1 is a block diagram illustrating an electronic device in a network environment according to various embodiments of the disclosure.

Referring to FIG. 1, an electronic device 101 in a network environment 100 may communicate with a first external electronic device 102 via a first network 198 (e.g., a short-range wireless communication network), or a second external electronic device 104 or a server 108 via a second network 199 (e.g., a long-range wireless communication network). According to an embodiment, the electronic device 101 may communicate with the second external electronic device 104 via the server 108. According to an embodiment, the electronic device 101 may include a processor 120 (e.g., including processing circuitry), memory 130, an input device 150, a sound output device 155, a display device 160, an audio module 170, a sensor module 176, an interface 177, a haptic module 179, a camera module 180, a power management module 188, a battery 189, a communication module 190 (e.g., including communication circuitry), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the first external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the first external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the first external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the first external electronic device 102, the second external electronic device 104, or the server 108) and performing communication via the established communication channel. The communication module 190 may include one or more communication processors that are operable independently from the processor 120 (e.g., AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the second external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the processor 120 may control the device device 160 to display content by using a first object including at least one second object. For example, the second object is used to render the content, and may include a scrollable object created through a second view class (e.g., a web view). The second view class may include an attribute and function available for the second objects. For example, the first object may include a scrollable object created through a first view class (e.g., a scroll view). The first view class may include an attribute and function available for the first objects.

According to an embodiment, upon changing a size of the content displayed on the display device 160, the processor 120 may change a size of a content display region in the first object in accordance with a change in the size of the content. For example, upon changing the size of the content, the processor 120 may change the first object such that the size of the content display region is changed in accordance with the change in the size of the content.

According to an embodiment, upon changing the size of the content displayed on the display device 160, the processor 120 may extend a size of the second object to a virtual region in order to restrict occurrence of a scroll in the second object. For example, the virtual region may include a maximum size that can be supported by the second object.

According to an embodiment, upon completion of the changing in the size of the content, the processor 120 may re-set the size of the second object in accordance with the size of the content. For example, the processor 120 may capture a screen of the display device 160 to display the captured screen at an upper end of the first object, and may re-set the size of the second object. Upon completion of the re-setting of the size of the second object, the processor 120 may remove the captured screen. For example, the content may be configured in a form of a HTML.

According to an embodiment, upon changing the size of the content displayed on the display device 160, the processor 120 may scroll the first object to maintain visibility of the content. For example, upon occurrence of an excess event (i.e., an over scroll) in the second object due to the extension of the content, the processor 120 may scroll the first object in accordance with a size of an excess region. For example, upon changing the size of the content, the processor 120 may set a reference region for the change of the content. The processor 120 may determine a scroll variable of the first object based on a ratio of the reference region and a size change value of the content. The processor 120 may scroll the first object based on the scroll variable. For example, the reference region may include a center region of a plurality of touch inputs detected for a zoom function or a region in which the touch input for the zoom function is detected.

Figure 2A:
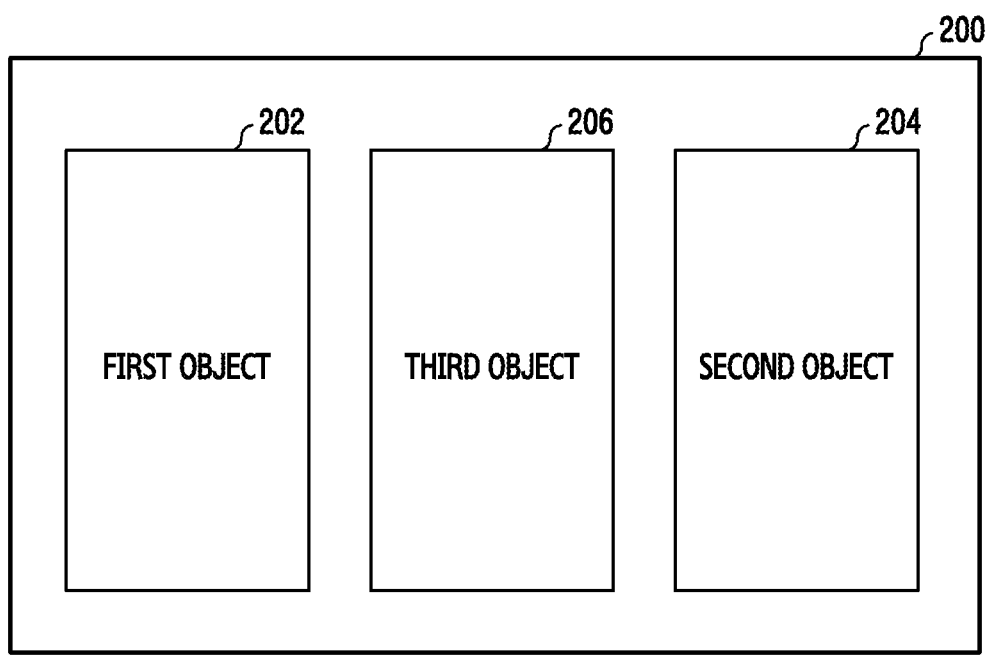

FIGS. 2A and 2B illustrate a structure of a processor for updating a content display region according to various embodiments of the disclosure. In the following description, a processor may include the processor 120 of FIG. 1.

Referring to FIG. 2A, a processor 200 may include a scrollable first object 202 created through a first view class (e.g., a scroll view), a scrollable second object 204 created through a second view class (e.g., a web view), and a not-scrolled third object 206 created through a third view class (e.g., a view container).

Referring to FIG. 2B, the first object 202 may include a plurality of views 212 or a second object 214 or a third object 206. The second object 204 may include rendered content_1 231 or content_2 233. The third object 206 may extract size information (e.g., size information based on a product of a height of content and a zoom magnification) of rendered content from the second object 204, and may transmit it to the first object 202.

According to an embodiment, upon receiving an input for displaying the content, the first object 202 may change a layout to display the content by using the second object 204. For example, upon receiving the input for displaying the content, the first object 202 may transmit a display request signal of the content to the second object 204. The second object 204 may render the content based on the display request signal. The second object 204 may transmit size information (e.g., a height of content and a zoom magnification) of the rendered content to the first object 202 through the third object 206. The first object 202 may set (or change) a display region for displaying the content based on the size information of the content. For example, the first object 202 may display at least part of the rendered content in the second object 204 through the display region.

According to an embodiment, upon occurrence of a size change event of the content, the second object 204 may increase a size of the second object 204 to a size of a virtual region. For example, upon receiving event occurrence information for changing the size of the content from the first object 202, the second object 204 may transmit zoom event occurrence information to the third object 206. The third object 206 may set a zoom magnification of the content included in the second object 204 to a maximum magnification. The second object 204 may change the size of the second object 204 to a maximum size supported by the second object 204 based on the setting of the third object 206. For example, upon changing the size of the second object 204, the third object 206 may extract size information of the content and transmit it to the first object 202. The first object 202 may update (or re-set) the display region of the content based on content size information provided from the third object 206.

According to an embodiment, upon completion of an event for changing the size of the content, the second object 204 may re-set the size of the second object 204. For example, upon completion of the event for changing the size of the content, the second object 204 may transmit size change event completion information to the third object 206. The third object 206 may set a zoom magnification of the content included in the second object 204 to a real magnification. The second object 204 may re-set the size of the second object 204 in accordance with the size of the content included in the second object 204 based on the setting of the third object 206. In this case, the first object 202 may capture the first object 202 and display it at an upper end of the first object 202 during a reference time (e.g., 300 ms) so that screen flickering caused by size re-setting of the second object 204 is not visible.

According to an embodiment, the first object 202 may be scrolled based on the change in the size of the content. For example, upon occurrence of an excess event (i.e., an over scroll) due to the extension of the content, the second object 204 may set a size of an excess region to a scroll variable. The first object 202 may be scrolled based on the scroll variable which is set in the second object 204. For example, when the size of the content is changed (e.g., zoomed in or zoomed out), the second object 204 may set a reference region for the change of the content. The second object 204 may determine the scroll variable based on a ratio of the reference region and a size change value of the content. The first object 202 may be scrolled based on the scroll variable which is set in the second object 204. For example, the ratio of the reference region may include a ratio of a height value of previous content before the size change and a height value of the reference region. For example, the size change value of the content may include a height difference of the content according to the change in the size of the content. For example, the reference region may include a center region of a plurality of touch inputs detected for a zoom function and a region in which the touch input for the zoom function is detected.

According to an embodiment, the first object 202, second object 204, and third object 206 included in the processor 200 may configured in the form of software, firmware, or instructions.

According to various embodiments of the disclosure, an electronic device includes a touch screen display, at least one processor electrically coupled to the touch screen display, and a memory electrically coupled to the at least one processor. The memory may store a first object located in a first view class which allows a second object located in the first object to be scrolled in the touch screen display, and the second object is included in a second view class. When executed, the memory may store instructions for allowing the at least one processor to display a user interface including web content through the touch screen display in such a manner that the second object including the web content is located in the first object, receive a user input for zooming in or zooming out the web content with a first magnification, zoom in or zoom out the web content with the first magnification in the second object of a selected magnification that is greater than the first magnification, irrespective of the first magnification, upon receiving the user input, and adjust the second object to have the first magnification after zooming in or zooming out the web content with the first magnification.

According to various embodiments, the selected magnification may be a maximum magnification.

According to various embodiments, the instructions cause the at least one processor to use a third object of a third view class which plays an intermediary role between the first object and the second object when zooming in or zooming out the web content.

According to various embodiments, the instructions cause the at least one processor to provide, by the first object, a touch event to the second object, provide, by the second object, the touch event to the third object, and set, by the third object, the selected magnification for the second object.

According to various embodiments, the first view class and the second view class may be included in part of an Android operating system. The first view class may include a scroll view class. The second view class may include a web view class.

According to various embodiments, the instructions cause the at least one processor to capture an image displayed with the first magnification after zooming in or zooming out the web content with the first magnification, and display the captured image through the touch screen display while the second object is adjusted with the first magnification.

According to various embodiments of the disclosure, an electronic device includes a display, a memory, and at least one processor coupled to the memory. When executed, the memory may store instructions for allowing the at least one processor to display content through the display in such a manner that a second object including the content is located in a first object, receive an input for changing a size of the content, change the size of the content, based on the input, and change a size corresponding to the second object, based on the changed size of the content, in the first object.

According to various embodiments, the instructions cause the at least one processor to render the content through the second object, change the size corresponding to the second object, based on size information of the rendered content, in the first object, and display the content through the first object having a changed size corresponding to the second object.

According to various embodiments, the instructions cause the at least one processor to scroll the first object, based on the changed size of the content.

According to various embodiments, the instructions cause the at least one processor to set a reference region for changing a size of the content, based on the input, and scroll the first object, based on a ratio of a position, in which a reference region is set, against the size of the content and a change in the size of the content.

According to various embodiments, the instructions cause the at least one processor to scroll the first object, based on at least part of the size of the content located out of the second object, upon changing the size of the content.

According to various embodiments, the instructions cause the at least one processor to store instructions for increasing a size of the second object to a size of a virtual region, based on the input. The first object may set a size corresponding to the second object in accordance with size information of the content included in the second object irrespective of a change in the size of the second object.

According to various embodiments, the instructions cause the at least one processor to capture a screen of the display upon completion of the changing of the size of the content, control the display to display the captured screen, and re-set the second object in accordance with the changed size of the content in a state where the captured screen is displayed on the display.

According to various embodiments, the instructions cause the at least one processor to capture at least part of the first object upon completion of the changing of the size of the content, and display the captured image at an upper end of the first object.

According to various embodiments, the size of the virtual region is set by a third object in response to receiving of the input for changing the size of the content.

Figure 3:
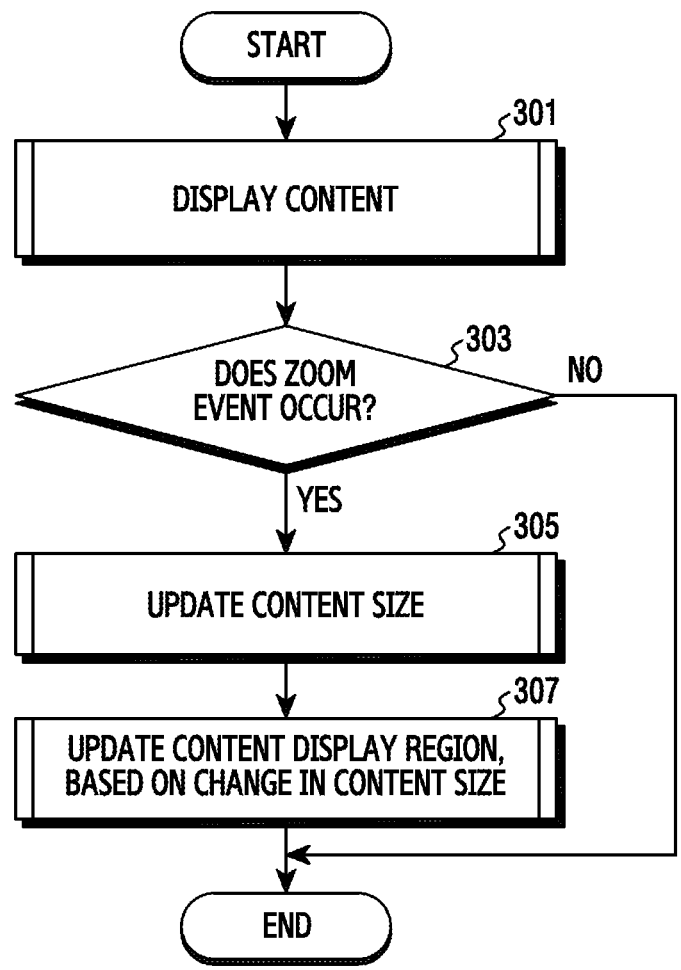
FIG. 3 illustrates a flowchart for updating a size of a content display region displayed on a display in an electronic device according to various embodiments of the disclosure.

FIG. 3 illustrates a flowchart for updating a size of a content display region displayed on a display in an electronic device according to various embodiments of the disclosure. In the following description, the electronic device may include the electronic device 101 of FIG. 1 or at least part (e.g., the processor 120) of the electronic device 101.

Referring to FIG. 3, in operation 301, the electronic device may display content on the display. For example, the processor 120 may render the content to be displayed on the display device 160 through the second object 204. The processor 120 may change the first object 202 based on size information of the rendered content (e.g., a height of content and a zoom magnification). For example, the processor 120 may set a region for displaying the content in the first object 202 based on the size information of the rendered content.

In operation 303, the electronic device may identify whether a zoom event occurs. For example, upon detecting a plurality of touch inputs, the processor 120 may identify whether at least one touch point is changed in a state where the touch input is maintained. For example, when a distance between touch inputs is increased based on the change of the touch point, the processor 120 may determine that a zoom-in event has occurred. For example, when the distance between the touch inputs is decreased based on the change of the touch point, the processor 120 may determine that a zoom-out event has occurred. For example, when a plurality of (e.g., two) touch inputs are continuously detected, the processor 120 may determine that the zoom event has occurred based on a double-tap input.

In operation 305, upon the occurrence of the zoom event, the electronic device may update a size of content displayed on the display in accordance with the zoom event. For example, the processor 120 may update the size of the content based on a change in a distance between the touch inputs. The processor 120 may continuously update the size of the content based on the change in the distance between the touch inputs while the touch input is maintained. For example, when the distance between the touch inputs is increased, the processor 120 may increase the size of the content displayed on the display device 160 in accordance with the change in the distance between the touch inputs. For example, when the distance between the touch inputs is decreased, the processor 120 may decrease the size of the content displayed on the display device 160 in accordance with the change in the distance between the touch inputs. For example, when the zoom event has occurred based on the double-tap input, the processor 120 may increase or decrease the size of the content displayed on the display device 160 with a predefined magnification. For example, the processor 120 may determine the zoom-in or the zoom-out based on the size of the content displayed on the display device 160 at a time at which the zoom event has occurred based on the double-tap input.

In operation 307, the electronic device may update a size of a display region of the content in accordance with a change in the size of the content displayed on the display. For example, upon changing the size of the content displayed on the display device 160, the processor 120 may change a size of a content display region, which is set in the first object 202, in accordance with the change in the size of the content. For example, the processor 120 may persistently change the size of the content display region, which is set in the first object 202, in accordance with the change in the size of the content while the zoom event is performed.

Figure 4:
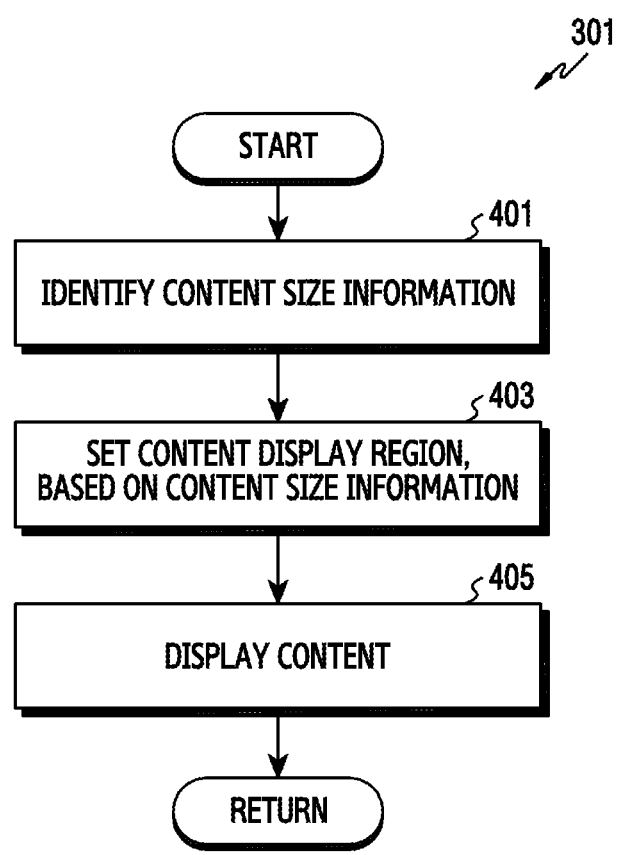
FIG. 4 illustrates a flowchart for displaying content in an electronic device according to various embodiments of the disclosure.

FIG. 4 illustrates a flowchart for displaying content in an electronic device according to various embodiments of the disclosure. Hereinafter, an operation for displaying the content in operation 301 of FIG. 3 is described. In the following description, the electronic device may include the electronic device 101 of FIG. 1 or at least part (e.g., the processor 120) of the electronic device 101.

Referring to FIG. 4, in operation 401, the electronic device may identify size information (e.g., a height of content and a zoom magnification) of content to be displayed on a display. For example, the processor 120 may render content to be displayed on the display device 160 through the second object 204. The processor 120 may identify size information of content rendered through the second object 204.

In operation 403, the electronic device may set a display region of content based on size information of the content. For example, the processor 120 may set a size of a region (a display region) for displaying the content in the first object 202 based on the size information of the content.

In operation 405, the electronic device may display the content on the display region of the content. For example, the processor 120 may display the content rendered in the second object 204 through the content display region which is set in the first object 202.

Figure 5:
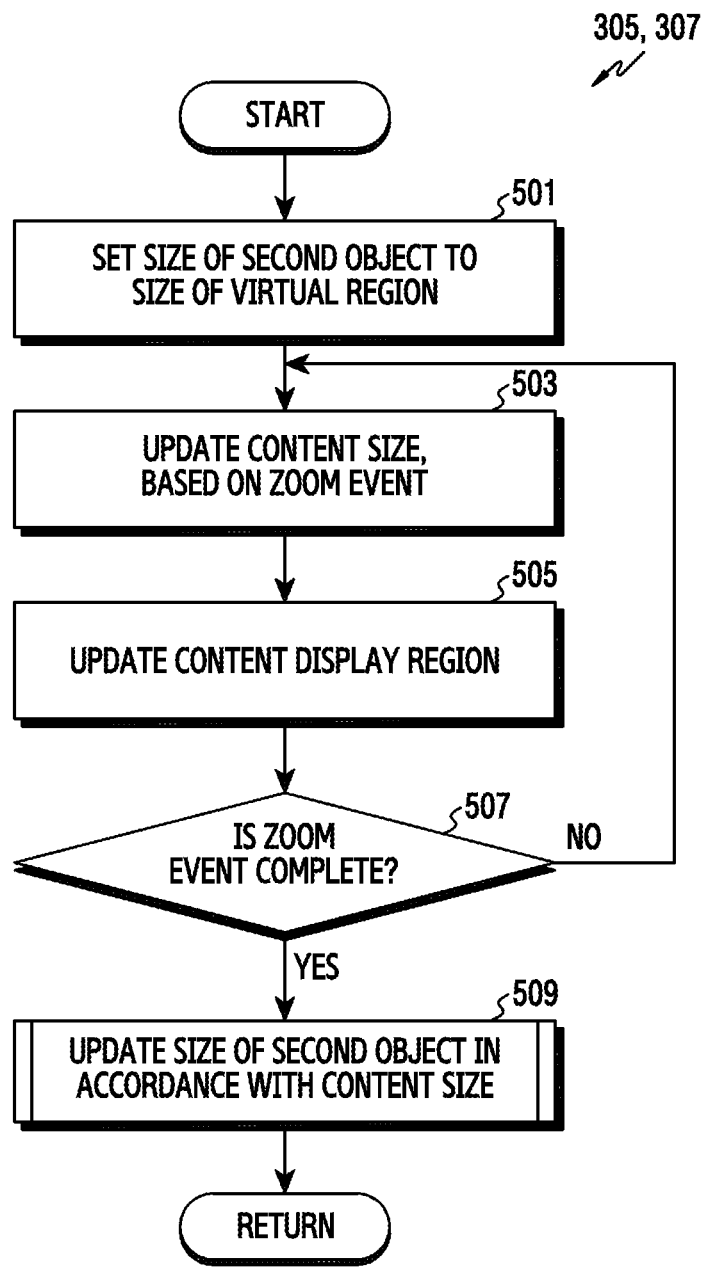
FIG. 5 illustrates a flowchart for updating a size of content by using a virtual region of a second object in an electronic device according to various embodiments of the disclosure.

FIG. 5 illustrates a flowchart for updating a size of content by using a virtual region of a second object in an electronic device according to various embodiments of the disclosure. Hereinafter, an operation for updating a size of a content display region in operations 305 and 307 of FIG. 3 is described. In the following description, the electronic device may include the electronic device 101 of FIG. 1 or at least part (e.g., the processor 120) of the electronic device 101.

Referring to FIG. 5, in operation 501, upon occurrence of a zoom event (e.g., operation 303 of FIG. 3), the electronic device may set a size of a second object corresponding to content, which is to be changed in size, to a size of the virtual region. For example, upon the occurrence of the zoom event for the content, the processor 120 may change the size of the second object corresponding to the content to a maximum size supported in the second object.

In operation 503, the electronic device may update the size of the content based on the zoom event. For example, the processor 120 may update the size of the content included in the second object 204 based on the zoom event. For example, the processor 120 may increase or decrease the size of the content based on a change in a distance between touch points.

In operation 505, the electronic device may update a display region of the content. For example, when the size of the content is increased or decreased in the second object 204, the processor 120 may identify the size of the content in the second object 204 which is set to have a size of a virtual region. The processor 120 may update the first object 202 in accordance with the size of the content, which is identified in the second object. For example, the processor 120 may change a size of a content display region included in the first object 202 based on the size of the content, which is identified in the second object 204.

In operation 507, the electronic device may identify whether the zoom event is complete. For example, the processor 120 may identify whether a touch input for changing the size of the content is released. When the touch input for changing the size of the content is released, the processor 120 may determine that the zoom event is complete. For example, when the zoom event has occurred based on a double tab, the processor 120 may identify whether a zoom magnification of the content is identical to a pre-set reference magnification. When the zoom magnification of the content is identical to the reference magnification, the processor 120 may determine that the zoom event is complete.

When the zoom event is not complete, in operation 503, the electronic device may update the size of the content. For example, upon detecting a change in an interval between touch points, the processor 120 may update the size of the content in accordance with the change in the interval between the touch points. For example, when the zoom event has occurred based on the double tab, the processor 120 may update the size of the content while changing the zoom magnification of the content by a reference interval.

In operation 509, upon completion of the zoom event, the electronic device may re-set a size of the second object in accordance with the size of the content. For example, the processor 120 may re-set the size of the second object 204, which is set to have a size of a virtual region, in accordance with the updated content size. For example, when the size of the second object 204 is re-set, the processor 120 may capture a screen of the display device 160 and control the display device 160 to display the captured screen during a reference time. The processor 120 may re-set the size of the second object 204 in a state where the captured screen is displayed, thereby preventing the screen from flickering due to the re-setting of the size of the second object 204.

Figure 6:
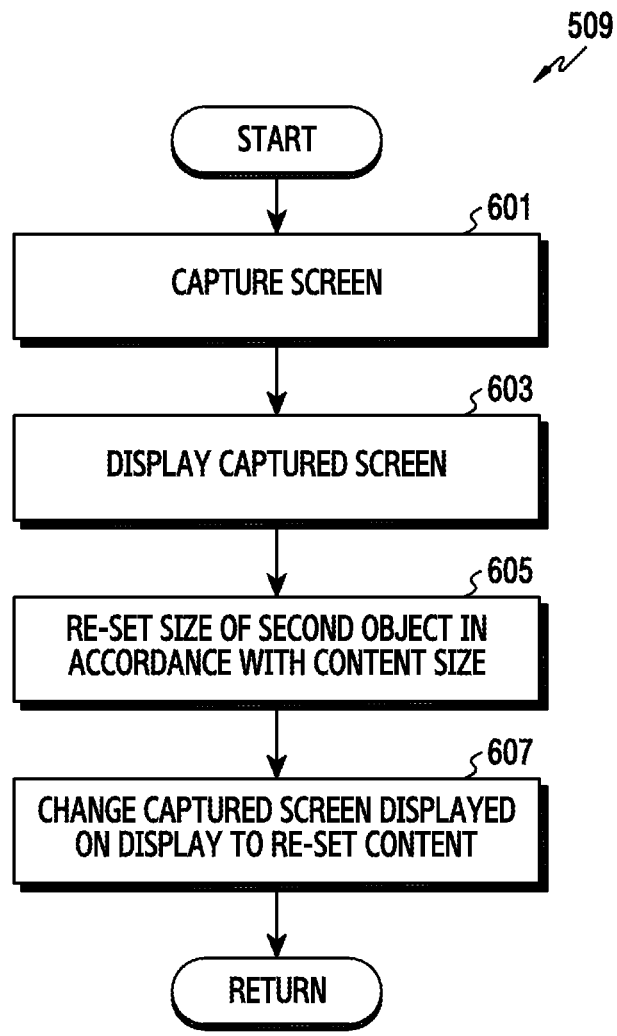
FIG. 6 illustrates a flowchart for changing a size of a second object in an electronic device according to various embodiments of the disclosure.

FIG. 6 illustrates a flowchart for changing a size of a second object in an electronic device according to various embodiments of the disclosure. Hereinafter, an operation for re-setting the size of the second object in operation 509 of FIG. 5 is described. In the following description, the electronic device may include the electronic device 101 of FIG. 1 or at least part (e.g., the processor 120) of the electronic device 101.

Referring to FIG. 6, in operation 601, upon completion of a zoom event (e.g., operation 509 of FIG. 5), the electronic device may capture a screen displayed on a display. For example, the processor 120 may capture the first object 202 including content.

In operation 603, the electronic device may display the captured screen on the display. For example, the processor 120 may control the display device 160 to display an image of the captured first object at an upper end of the first object 202.

In operation 605, the electronic device may re-set a size of the second object in accordance with an updated size of content in a state where the captured screen is displayed. For example, the processor 120 may re-set the size of the second object 204 in accordance with the content by changing a maximum magnification, which is used to set the size of the second object 204 to a size of a virtual size, to a real zoom magnification.

In operation 607, when the size of the second object is re-set, the electronic device may remove the captured screen displayed on the display. For example, upon completion of the re-setting of the second object, the processor 120 may control the display device 160 to display content included in the second object 205, of which size is re-set, by removing an image of the captured first object displayed at an upper end of the first object 202.

According to various embodiments of the disclosure, the electronic device 101 may be configured to display the captured screen during a time (reference time) required to re-set the size of the second object. In this case, the display device 160 may remove the captured screen when the reference time elapses after the captured screen is displayed.

Figure 7:
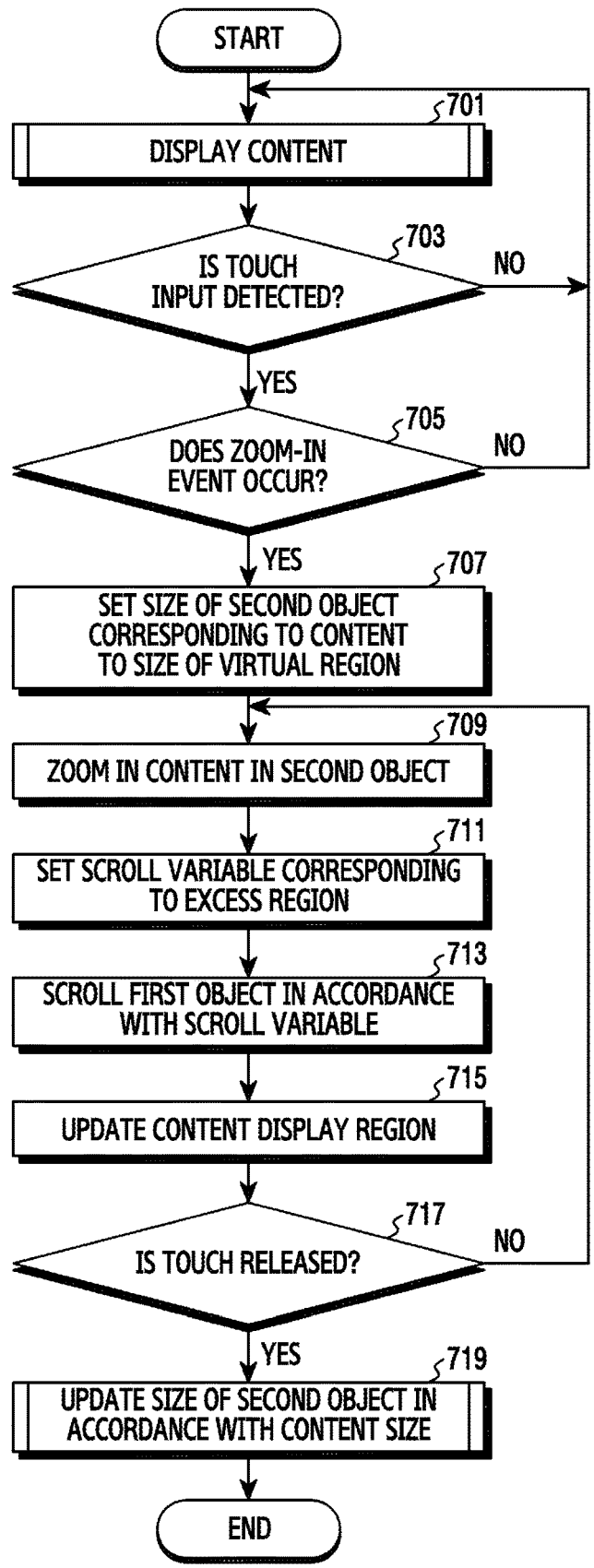
FIG. 7 illustrates a flowchart for zooming in content displayed on a display in an electronic device according to various embodiments of the disclosure.

FIG. 7 illustrates a flowchart for zooming in content displayed on a display in an electronic device according to various embodiments of the disclosure.

FIGS. 8A, 8B, 8C, 8D and FIG. 8E illustrate a screen configuration for zooming in content displayed on a display in an electronic device according to various embodiments of the disclosure. In the following description, the electronic device may include the electronic device 101 of FIG. 1 or at least part (e.g., the processor 120) of the electronic device 101.

Figure 8A:
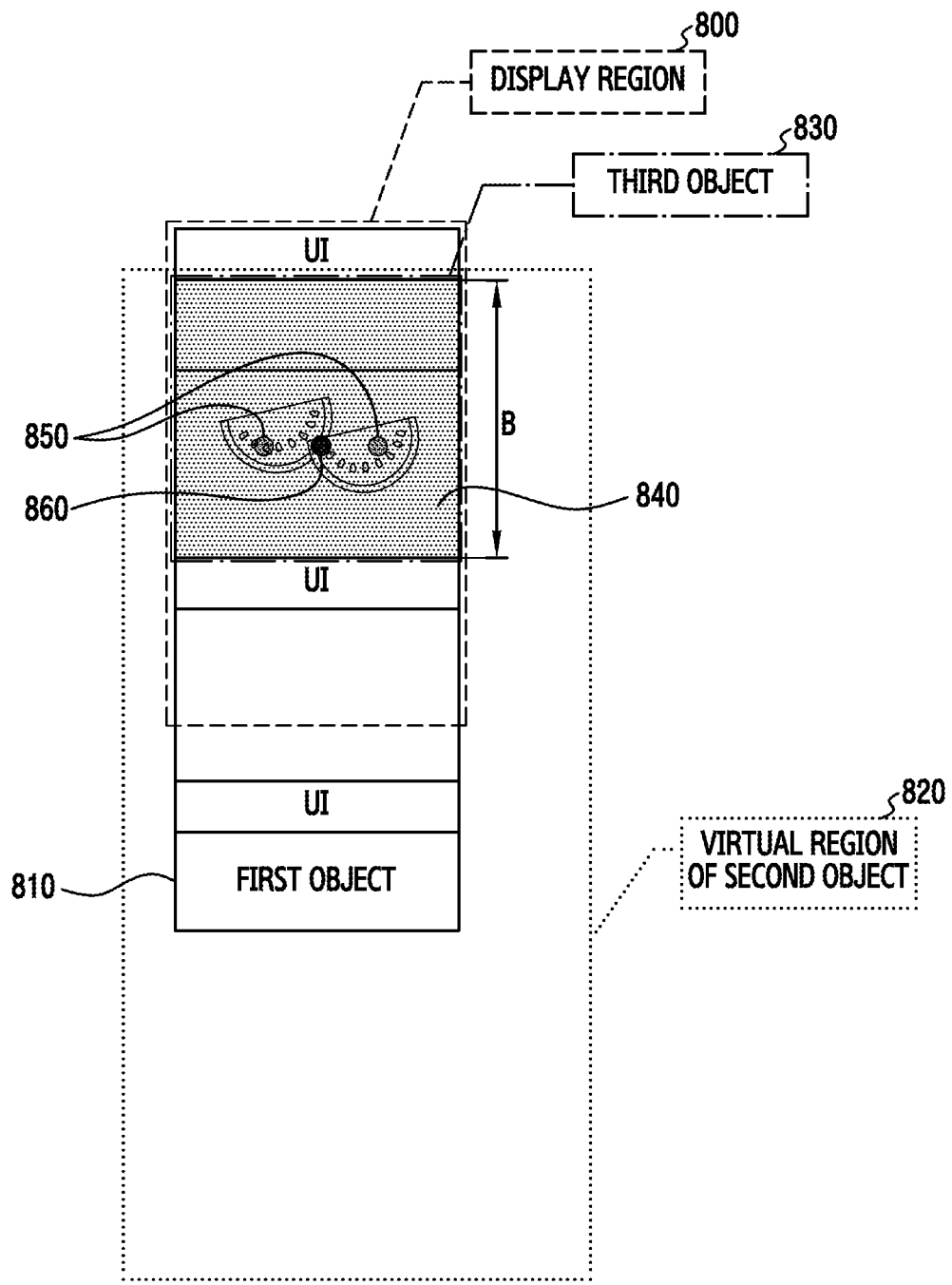
FIGS. 8A, 8B, 8C, 8D, and FIG. 8E illustrate a screen configuration for zooming in content displayed on a display in an electronic device according to various embodiments of the disclosure.

Referring to FIG. 7, in operation 701, the electronic device may display content on a display. For example, similarly to operations 401 to 405 of FIG. 4, the processor 120 may control the display 160 to display the content in the first object 202 based on size information (e.g., a height of content and a zoom magnification) of the content rendered through the second object 204. For example, as shown in FIG. 8A, the processor 120 may render content 840 to be displayed on the display device 160 through the second object 204. The processor 120 may change a first object 810 to display the content 840 based on size information (e.g., a height of content and a zoom magnification) of the rendered content 840. The processor 120 may control the display device 160 to display the content 840 included in the second object 204 through the changed first object 810. For example, the display device 160 may display at least part of the first object 810 in accordance with a display region 800.

In operation 703, the electronic device may identify whether a touch input corresponding to the content displayed on the display is detected. For example, as shown in FIG. 8A, the processor 120 may identify whether at least one touch input 850 is detected for the content 840 displayed on the display device 160.

In operation 705, upon detecting the touch input corresponding to the content, the electronic device may identify whether a zoom-in event occurs. For example, when a distance between touch points is increased due to a movement of the touch point in a state where the plurality of touch inputs 850 for the content 840 are maintained, the processor 120 may determine that the zoom-in event has occurred.

In operation 707, upon the occurrence of the zoom-in event, the electronic device may set a size of a second object corresponding to the content to a size of a virtual region. For example, upon the occurrence of the zoom-in event, as shown in FIG. 8A, the processor 120 may change the size of the second object 204 to a maximum size supported in the second object 204. For example, a third object 830 may provide control such that the first object 810 recognizes the size of the second object 204 equally to a size B of content in a state where the size of the second object 204 is set to the size of the virtual region 820. Accordingly, the third object 830 may be set to have the same size as a display region of content included in the first object 810.

Figure 8B:
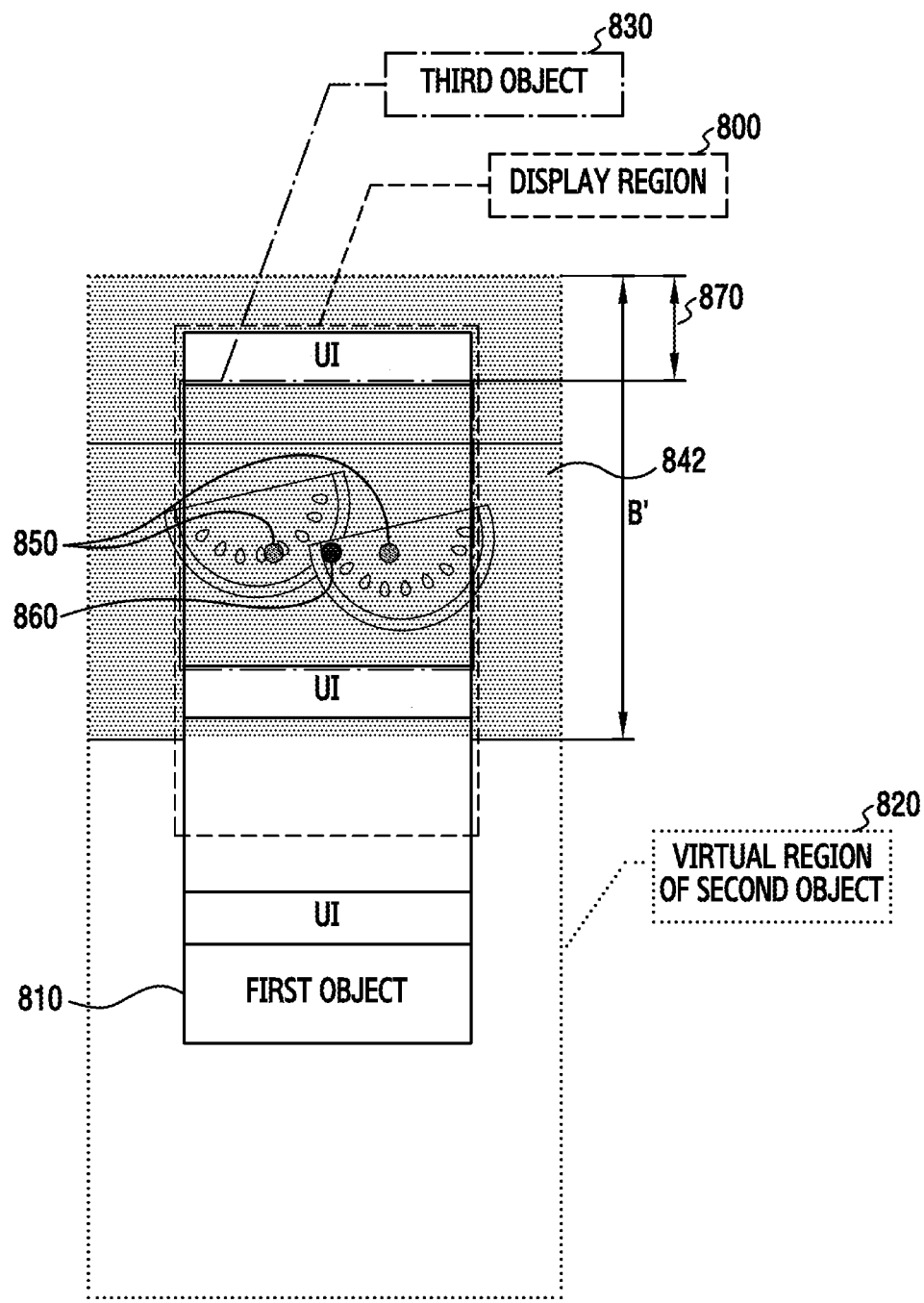

In operation 709, the electronic device may increase a size of content in the second object. For example, when an interval between the plurality of touch inputs 850 for the content 840 is increased, the processor 120 may zoom in content 842 (B→B') as shown in FIG. 8B through the virtual region 820 of the second object 204 based on an interval change. For example, when the size of the content is increased, the processor 120 may determine a center of the plurality of the touch inputs 850 as a reference region 860 for zooming in the content.

In operation 711, the electronic device may set a scroll variable corresponding to an excess region. For example, when the processor 120 increases a size of the content 842 through the virtual region 820 of the second object 204, an excess region 870 may be created. The processor 120 may set the size of the excess region 870 as a scroll variable of the first object 810 according to a zoom-in event.

Figure 8C:
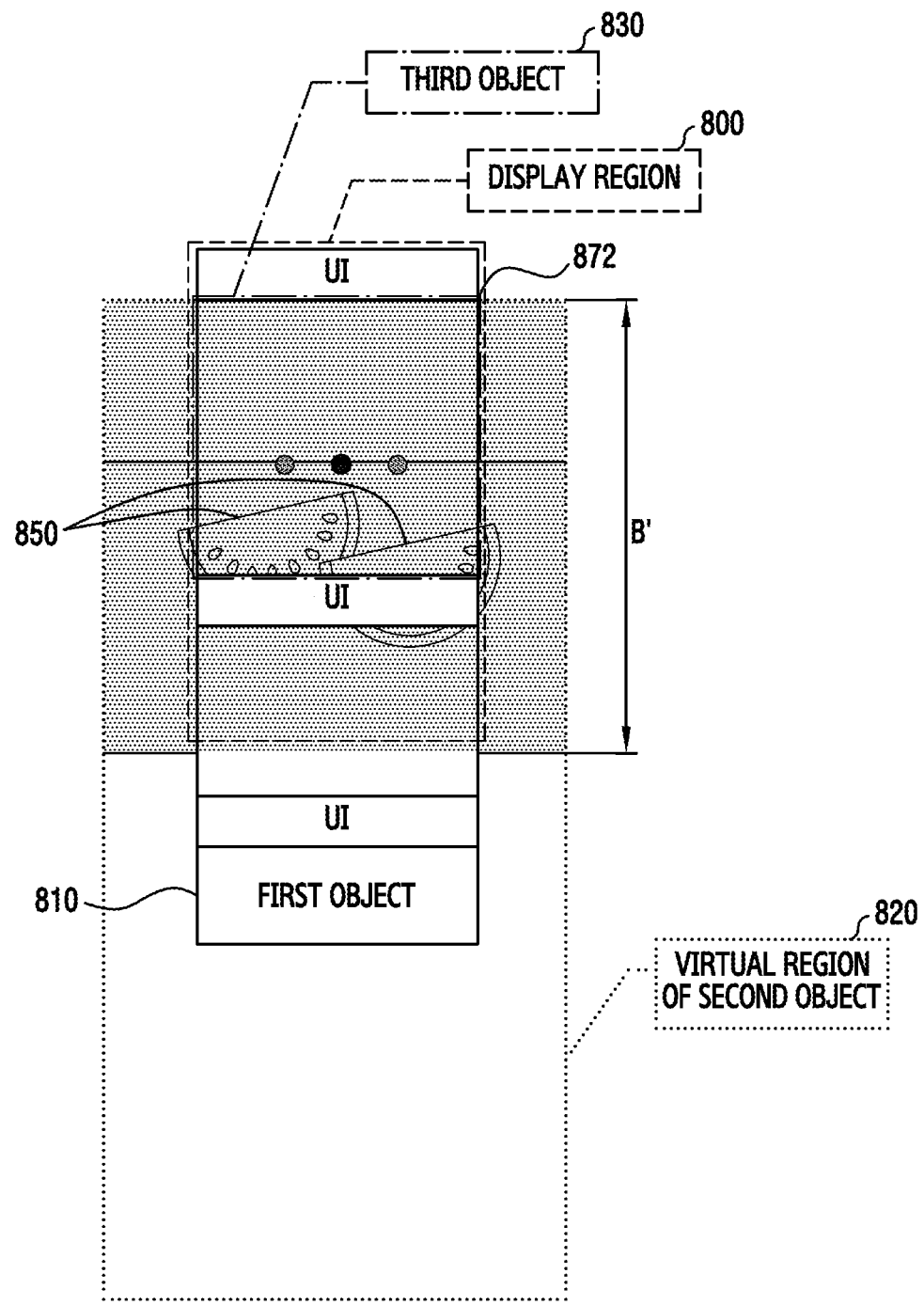
Figure 8D:
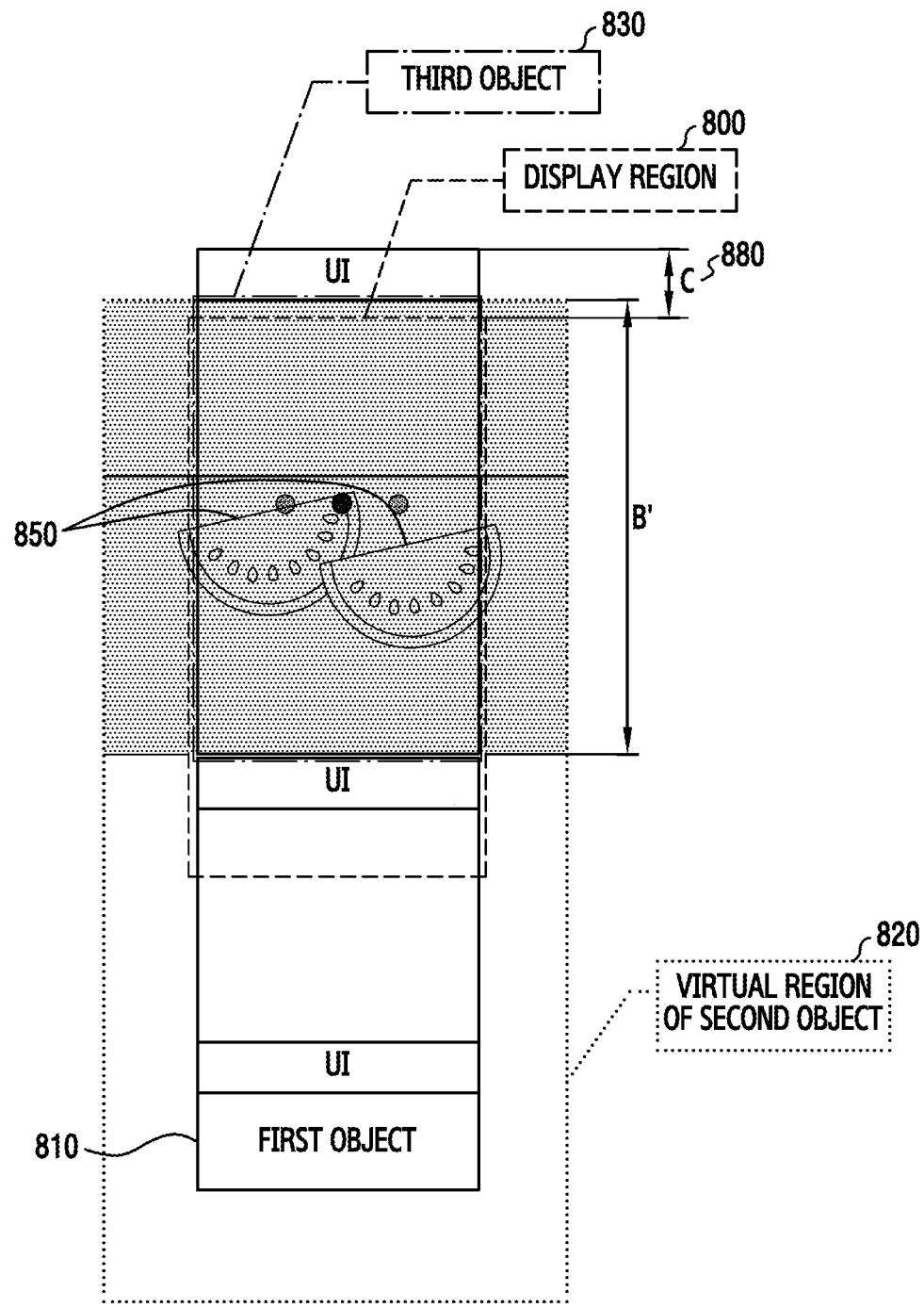
Figure 8E:
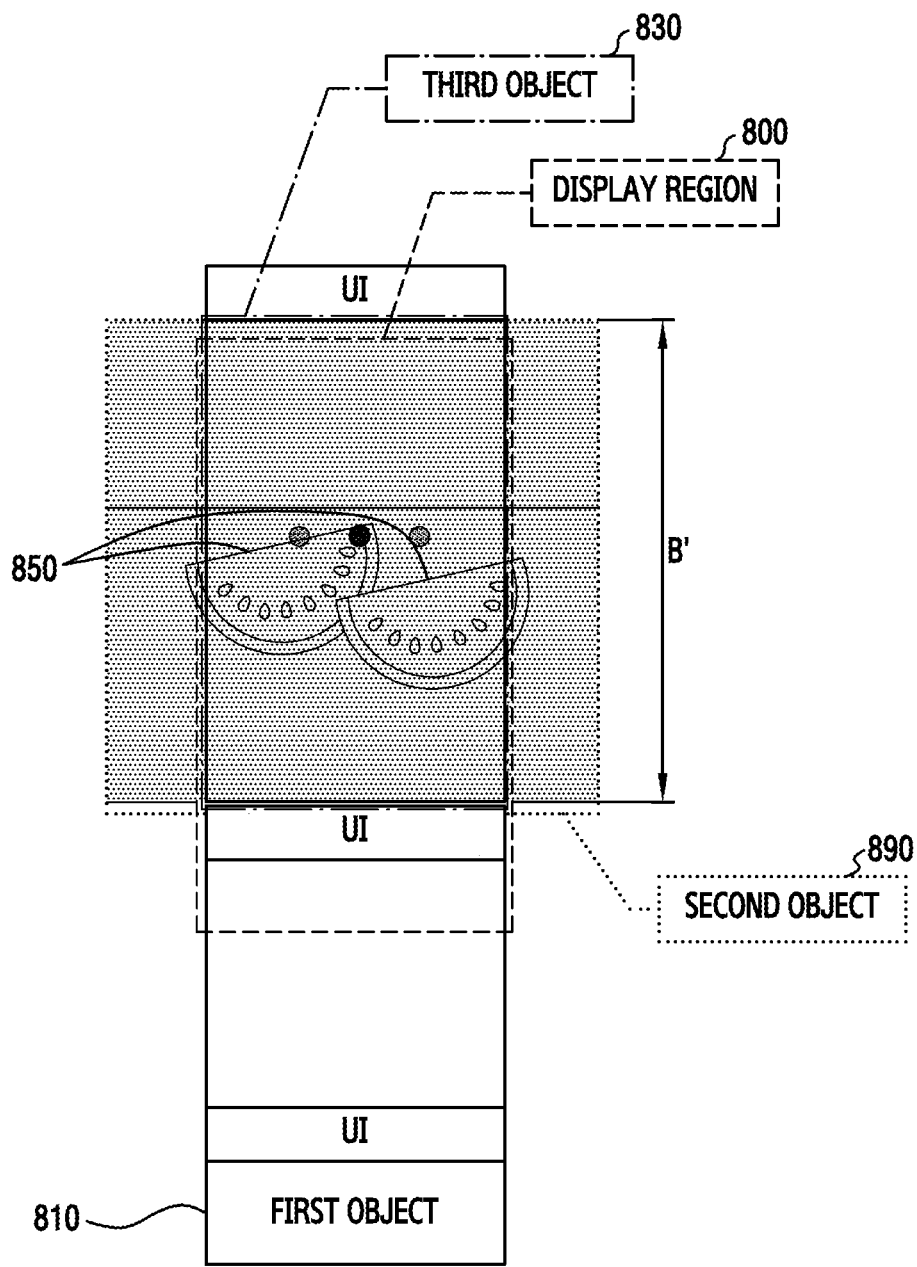

In operation 713, the electronic device may scroll the first object in accordance with the scroll variable. For example, when an excess event (i.e., an over scroll) occurs in the second object 204, as shown in FIG. 8C, the processor 120 may change a scroll of the second object 204 to 0 (see 872). As shown in FIG. 8D, the processor 120 may scroll the first object 202 in accordance with the scroll variable which is set based on a size of the excess region 870 (see 880).

In operation 715, the electronic device may update a size of a content display region in accordance with the zoom-in of the content. For example, the processor 120 may increase the size of the content display region included in the first object 810 in accordance with the increased size of content included in the second object 204.

In operation 717, the electronic device may identify whether a touch input corresponding to the zoom-in event is released.

When the touch input corresponding to the zoom-in event is maintained, in operation 709, the size of the content may be increased based on a change in an interval between touch inputs. For example, upon the occurrence of the change in the interval between the touch inputs, the processor 120 may re-set a reference region for zooming in the content in accordance with a change of a touch point.

In operation 719, when the touch input corresponding to the zoom-in event is released, the electronic device may update a size of the second object in accordance with the size of the content. For example, similarly to operations 601 to 607 of FIG. 6, the processor 120 may re-set the size of the second object 204 in accordance with information of the increased size of the content included in the second object 204 (see 890). In this case, the processor 120 may control the display device 160 to display the captured screen during the re-setting of the size of the second object 204, thereby preventing the screen from shaking due to the re-setting of the size of the second object 204.

Figure 9:
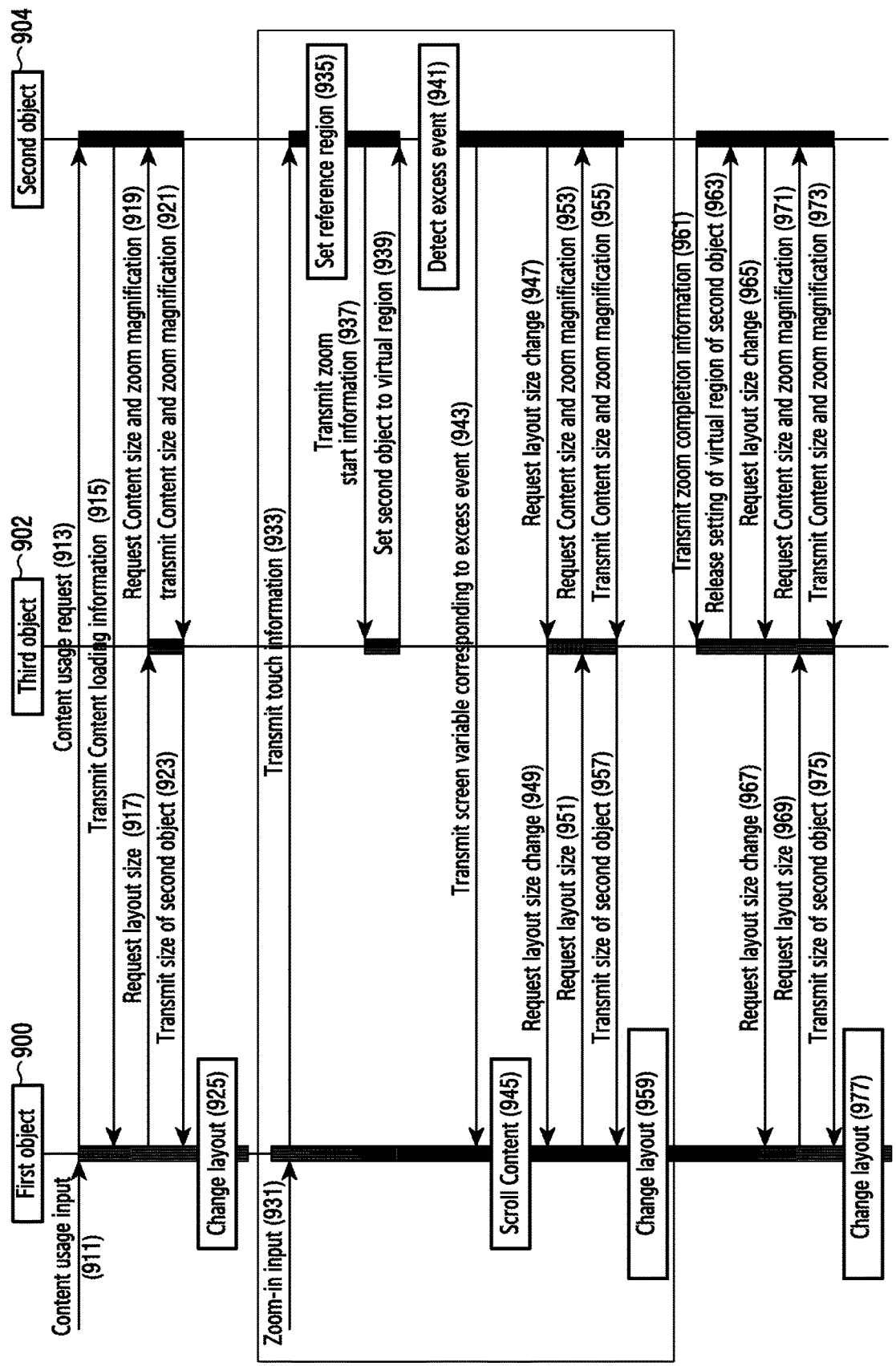
FIG. 9 illustrates a signal flow diagram for zooming in content displayed on a display in an electronic device according to various embodiments of the disclosure.

FIG. 9 illustrates a signal flow diagram for zooming in content displayed on a display in an electronic device according to various embodiments of the disclosure.

Referring to FIG. 9, a first object 900, a third object 902, and a second object 904 may be configured in a form of software or instructions used to display the content in the electronic device (e.g., the electronic device 101 of FIG. 1).

According to an embodiment, upon receiving a content usage input (see 911), the first object 900 (e.g., the first object 202 of FIG. 2A) may set a display region of content based on size information of the content included in the second object 904 (e.g., the second object 204 of FIG. 2A). For example, in response to reception of the content usage input 911, the first object 900 may transmit a content usage request signal to the second object 904 (see 913). For example, the first object 900 may deliver a content open event to the second object 904. The second object 904 may render the content in response to reception of the content usage request signal. Upon the completion of the rendering of the content, the second object 904 may transmit loading information of the rendered content (e.g., a content loading complete event) to the first object 900 (see 915). The first object 900 may transmit a layout size request signal to the third object 902 (e.g., the third object 206 of FIG. 2A) based on the content loading information (see 917). The third object 902 may transmit a content size request signal to the second object 904 based on the layout size request signal (see 919). In response to reception of the content size request signal, the second object 904 may transmit size information of the rendered content (e.g., size information based on a product of a content size and a zoom magnification) to the third object 902 (see 921). The third object 902 may set the size information of the content, received from the second object 904, to a size of the second object 904, and may transmit it to the first object 900 (see 923). The first object 900 may change a layout in accordance with a size of the second object 904, received from the third object 902 (see 925). For example, the first object 900 may re-set a size of a display region for displaying the content rendered in the second object 904 in the layout in accordance with the size of the second object 904, received from the third object 902.

According to an embodiment, when zooming in the content based on a zoom-in event, the first object 900 may be scrolled in accordance with a change in the size of the content. For example, the zoom-in input may include a movement of at least one touch input such that an interval between touch inputs is increased in a state where a plurality of touch inputs corresponding to the content is maintained. For example, upon receiving the zoom-in input (see 931), the first object 900 may transmit touch information (e.g., an interval between touch inputs) corresponding to the zoom-in input to the second object 904 (see 933). The second object 904 may set a reference region for the zoom-in of the content based on touch information for zooming in the content (see 935). For example, the reference region may include a center point between touch inputs for zooming in the content. The second object 904 may transmit zoom start information to the third object 902 (see 937). The third object 902 may set a size of the second object 904 to a size of a virtual region in response to reception of the zoom start information (see 939). For example, the virtual region may include a size of a state in which content rendered in the second object 904 are zoomed in with a maximum magnification. Upon detecting an excess event (i.e., an over scroll) caused by an increase in the size of the content (see 941), the second object 904 may create a scroll variable based on a size of an excess region detected based on the increase in the size of the content. The second object 904 may transmit the scroll variable to the first object 900 (see 943). The first object 900 may be scrolled in accordance with the scroll variable (see 945).

According to an embodiment, when the content are zoomed in based on the zoom-in event, the first object 900 may change a layout in accordance with the change in the size of the content. For example, when the size of the content is increased, the second object 904 may transmit a layout size change request signal to the first object 900 through the third object 902 (see 947, 949). The first object 900 may transmit a layout size request signal to the third object 902 in response to reception of the layout size change request signal (see 951). The third object 902 may transmit a content size request signal to the second object 904 based on the layout size request signal (see 953). In response to reception of the content size request signal, the second object 904 may transmit size information of the zoomed-in content (e.g., a content size and a zoom magnification) to the third object 902 (see 955). The third object 902 may set content size information (e.g., size information based on a product of a content size and a changed zoom magnification) received from the second object 904 to a size of the second object 904, and may transmit it to the first object 900 (see 957). The first object 900 may zoom in a region of the second object 904 in a layout in accordance with a size of the second object 904, received from the third object 902 (see 959).

According to an embodiment, the first object 900, the third object 902, and the second object 904 may repeat operations (operations 931 to 959) for scrolling the first object 900 and changing the layout during the zoom-in event is maintained.

According to an embodiment, the second object 904 may re-set the size of the second object 904 in accordance with the size of the content in response to the completion of the zoom event. For example, when the touch input for zooming in the content is released, the second object 904 may determine that the zoom event is complete. Upon completion of the zoom event, the second object 904 may transmit zoom completion information to the third object 902 (see 961). The third object 902 may release the setting of the virtual region of the second object 904 in response to reception of the zoom completion information (see 963). The second object 904 may re-set the size of the second object 904 in accordance with the size of the content based on the release of the setting of the virtual region. The second object 904 may transmit a layout size change request signal to the first object 900 through the third object 902 according to the re-setting of the size of the second object 904 (see 965, 967). The first object 900 may transmit a layout size request signal to the third object 902 in response to reception of the layout size change request signal (see 969). The third object 902 may transmit a content size request signal to the second object 904 based on the layout size request signal (see 971). In response to reception of the content size request signal, the second object 904 may transmit size information of the content (e.g., a content size and a zoom magnification) to the third object 902 (see 973). The third object 902 may set the content size information received from the second object 904 to a size of the second object 904, and may transmit it to the first object 900 (see 975). The first object 900 may re-set a size of a region of the second object 904 in a layout in accordance with a size of the second object 904, received from the third object 902 (see 977). For example, the first object 900 may capture the first object 900 and dispose it at an upper end of the first object 900 while the size of the second object 904 is re-set (operations 963 to 977), thereby preventing the screen from flickering due to the re-setting of the size of the second object 904.

Figure 10:
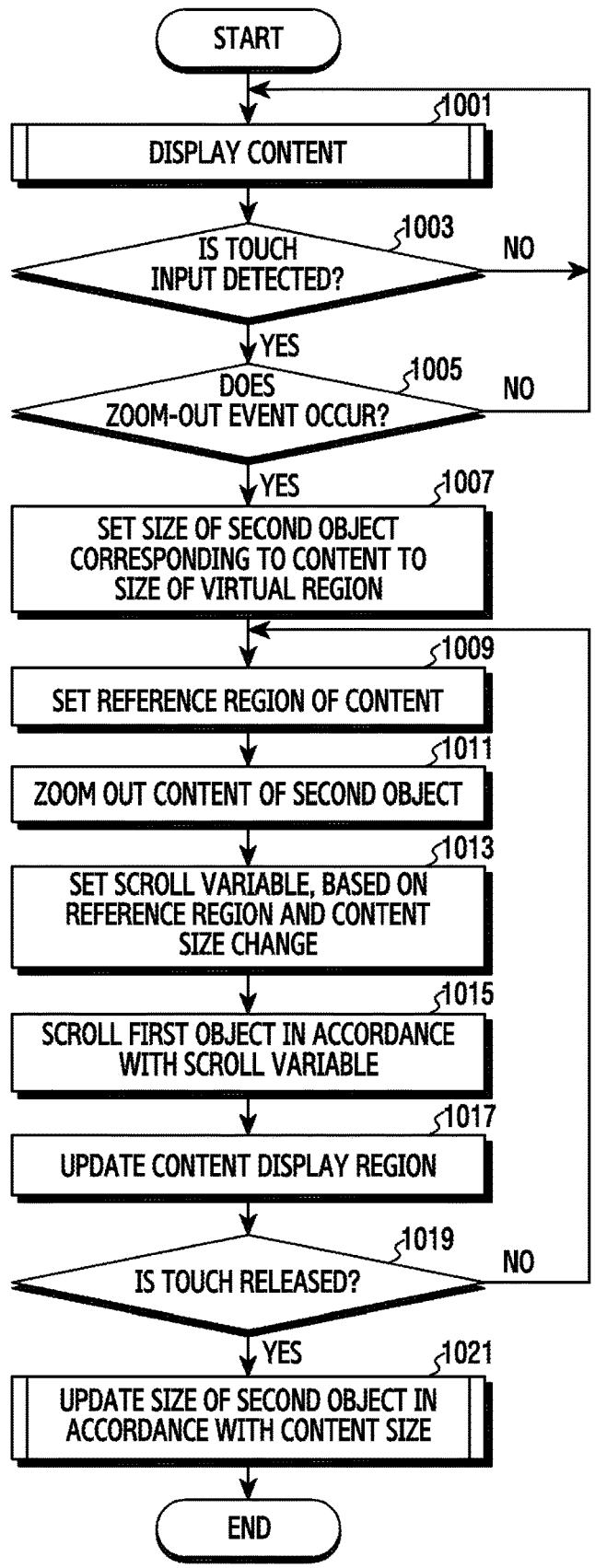
FIG. 10 illustrates a flowchart for zooming out content displayed on a display in an electronic device according to various embodiments of the disclosure.

FIG. 10 illustrates a flowchart for zooming out content displayed on a display in an electronic device according to various embodiments of the disclosure.

Figure 11A:
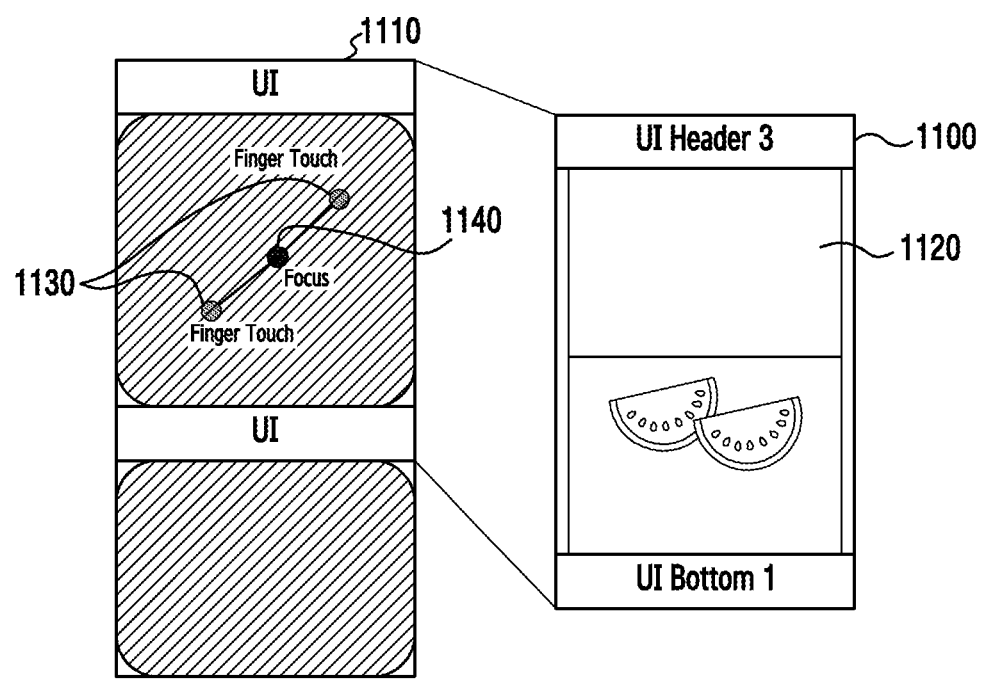
FIGS. 11A and 11B illustrate a screen configuration for zooming out content displayed on a display in an electronic device according to various embodiments of the disclosure.
Figure 11B:
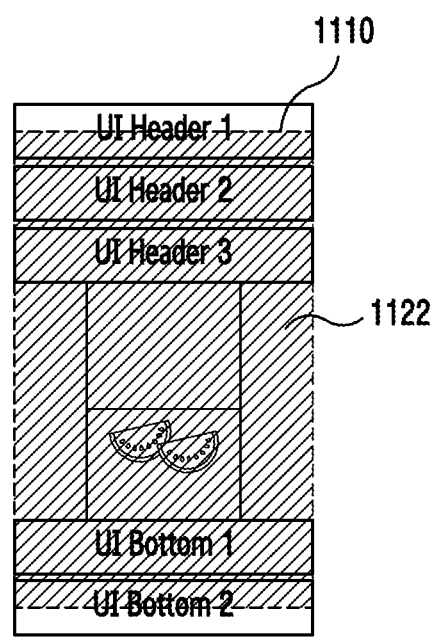

FIGS. 11A and 11B illustrate a screen configuration for zooming out content displayed on a display in an electronic device according to various embodiments of the disclosure. In the following description, the electronic device may include the electronic device 101 of FIG. 1 or at least part (e.g., the processor 120) of the electronic device 101.

Referring to FIG. 10, in operation 1001, the electronic device may display content on the display. For example, similarly to operations 401 to 405 of FIG. 4, the processor 120 may control the display device 160 to display corresponding content 1120 (see FIG. 11A) by changing a layout 1110 of the first object 202 based on size information (e.g., a height of content and a zoom magnification) of the content included in the second object 204.

In operation 1003, the electronic device may identify whether a touch input corresponding to the content displayed on the display is detected. For example, as shown in FIG. 11A, the processor 120 may identify whether at least one touch input 1130 is detected for the content 1120 displayed on the display device 160.

In operation 1005, upon detecting the touch input corresponding to the content, the electronic device may identify whether a zoom-out event occurs based on the touch input. For example, when a distance between touch points is decreased due to a movement of the touch point in a state where the plurality of touch inputs 1130 for the content 1120 are maintained, the processor 120 may determine that the zoom-out event has occurred.

In operation 1007, upon the occurrence of the zoom-out event for content, the electronic device may set a size of a second object corresponding to the content to a size of a virtual region. For example, upon the occurrence of the zoom-out event, the processor 120 may increase the size of the second object 204 to the size of the virtual region. For example, the size of the second object 204 may be increased to the size of the virtual region by setting a zoom magnification of the content included in the second object 204 to a predefined magnification (e.g., a maximum magnification).

In operation 1009, the electronic device may set a reference region for decreasing a size of the content based on touch information. For example, when the size of the content is decreased, the processor 120 may set a center 1140 of the plurality of touch inputs 1130 as a reference region for zooming out the content.

In operation 1101, the electronic device may decrease the size of the content in the second object. For example, when an interval between the plurality of touch inputs 1130 for the content 1120 is decreased, the processor 120 may zoom out content 1122 as shown in FIG. 11B through the second object 204 based on an interval change.

In operation 1013, the electronic device may set a scroll variable based on a content reference region and a content size change. For example, the processor 120 may set the scroll variable based on a ratio for a height of the previous content 1120 of which a size is not yet decreased and a height of a reference region and a height change value depending on the zoom-out of the content.

In operation 1015, the electronic device may scroll the first object in accordance with the scroll variable. For example, when the size of the content is decreased, the processor 120 may scroll the first object 202 to maintain visibility of the reference region of the content.

In operation 1017, the electronic device may update a size of a display region of the content in accordance with a decrease in the size of the content. For example, the processor 120 may decrease the size of the display region corresponding to the second object 204, in the first object 202, in accordance with the decreased size of the content in the second object 204.

In operation 1019, the electronic device may identify whether a touch input corresponding to the zoom-out event is released.

When the touch input corresponding to the zoom-out event is maintained, in operation 1009, the electronic device may re-set a reference region for zooming out the content based on an interval change between touch inputs.

In operation 1021, when the touch input corresponding to the zoom-out event is released, the electronic device may update a size of the second object in accordance with the size of the content. For example, similarly to operations 601 to 607 of FIG. 6, the processor 120 may re-set the size of the second object 204 in accordance with size information of content rendered through the second object 204 in a state where the display device 160 is indicated to display a captured screen.

Figure 12:
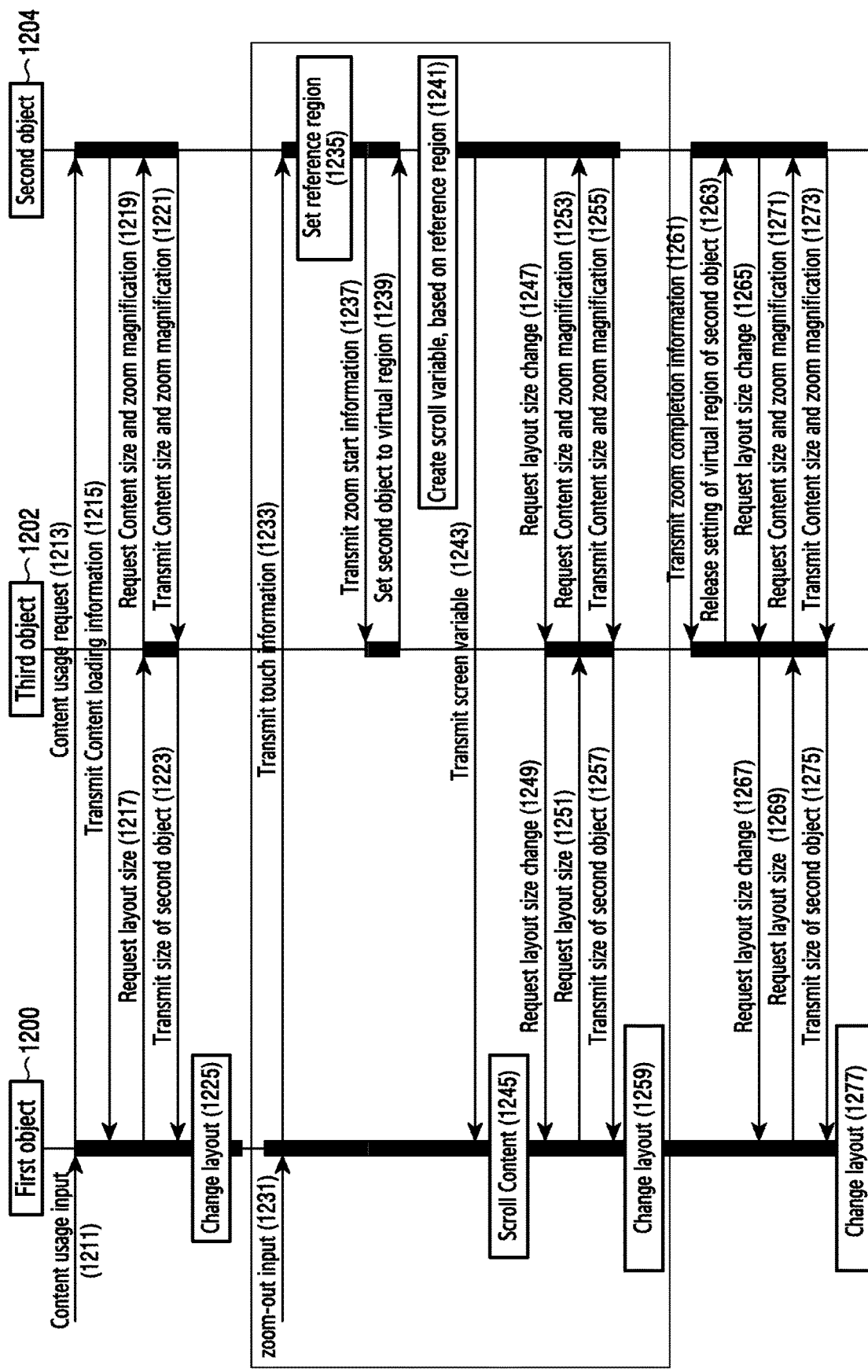
FIG. 12 illustrates a signal flow diagram for zooming out content displayed on a display in an electronic device according to various embodiments of the disclosure.

FIG. 12 illustrates a signal flow diagram for zooming out content displayed on a display in an electronic device according to various embodiments of the disclosure.

Referring to FIG. 12, a first object 1200, a third object 1202, and a second object 1204 may be configured in a form of software or instructions used to display the content in the electronic device (e.g., the electronic device 101 of FIG. 1).

According to an embodiment, upon receiving a content usage input (see 1211), the first object 1200 (e.g., the first object 202 of FIG. 2A) may change a layout based on size information of content included in the second object 1204 (e.g., the second object 204 of FIG. 2A). For example, since operations (operations 1211 to 1225) for changing the layout of the first object 1200 in accordance with a size of the second object 1204 are identical to operations (operations 911 to 925) for changing the layout of the first object 900 in accordance with a size of the second object 904 in FIG. 9, detailed descriptions may be omitted.

According to an embodiment, when zooming out the content based on a zoom-out event, the first object 1200 may be scrolled in accordance with a change in the size of the content. For example, the zoom-out input may include a movement of at least one touch input such that an interval between touch inputs is decreased in a state where a plurality of touch inputs corresponding to the content is maintained. For example, upon receiving the zoom-out input (see 1231), the first object 1200 may transmit touch information (e.g., an interval between touch inputs) corresponding to the zoom-out input to the second object 1204 (see 1233). The second object 1204 may set a reference region for the zoom-out of the content based on touch information for zooming out the content (see 1235). For example, the reference region may include a center point between touch inputs for zooming out the content. The second object 1204 may transmit zoom start information to the third object 1202 (see 1237). The third object 1202 may set a size of the second object 1204 to a size of a virtual region in response to reception of the zoom start information (see 1239). For example, the size of the virtual region may include a size of a state in which content rendered in the second object 1204 are zoomed in with a maximum magnification. The second object 1204 may create a scroll variable based on a height change caused by the zoom-out of the content and a ratio of a region in which a reference region is located (see 1241). The second object 1204 may transmit the scroll variable to the first object 1200 (see 1243). The first object 1200 may be scrolled in accordance with the scroll variable (see 1245).

According to an embodiment, when the size of the content is decreased based on the zoom-out event, the first object 1200 may change a layout in accordance with the change in the size of the content. For example, since operations (operations 1247 to 1259) for changing the layout of the first object 1200 in accordance with a size of the second object 1204 are identical to operations (operations 949 to 959) for changing the layout of the first object 900 in accordance with a size of the second object 904 in FIG. 9, detailed descriptions may be omitted.

According to an embodiment, the first object 1200, the third object 1202, and the second object 1204 may repeat operations (operations 1231 to 1259) for scrolling the first object 1200 and changing the layout while the zoom-out event is maintained.

According to an embodiment, the second object 1204 may re-set the size of the second object 1204 in accordance with the size of the content in response to the completion of the zoom event. For example, since operations (operations 1261 to 1277) for re-setting the size of the second object 1204 upon the completion of the zoom event are identical to operations (operations 961 to 977), detailed descriptions may be omitted.

Figure 13:
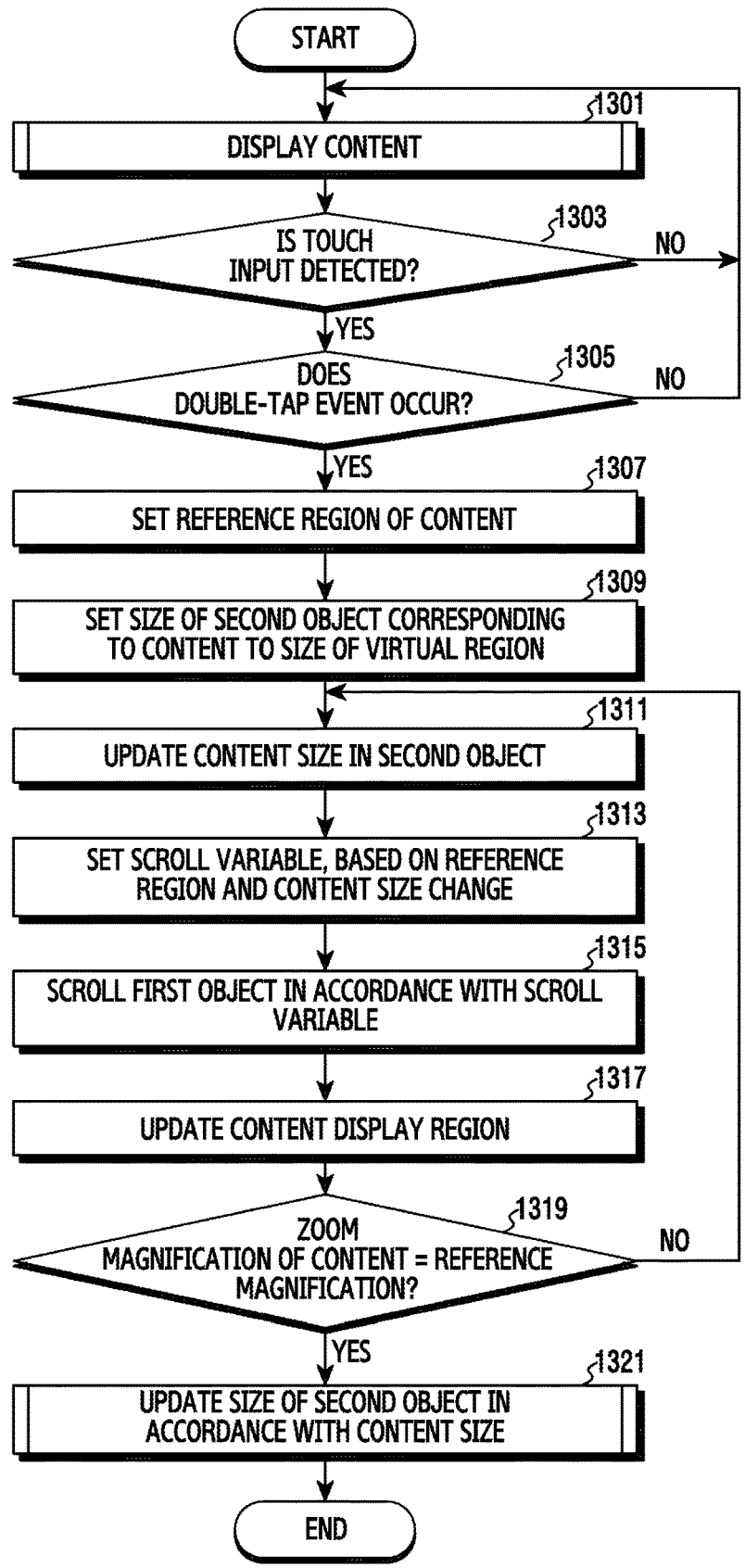
FIG. 13 illustrates a flowchart for updating a size of content displayed on a display on a basis of a double-tap event in an electronic device according to various embodiments of the disclosure.

FIG. 13 illustrates a flowchart for updating a size of content displayed on a display on a basis of a double-tap event in an electronic device according to various embodiments of the disclosure. In the following description, the electronic device may include the electronic device 101 of FIG. 1 or at least part (e.g., the processor 120) of the electronic device 101.

Referring to FIG. 13, in operation 1301, the electronic device may display content on the display. For example, similarly to operations 401 to 405 of FIG. 4, the processor 120 may change a layout of the first object 202 based on size information of corresponding content (e.g., a height of content and a zoom magnification) to ensure a display region of content included in the second object 204. The processor 120 may control the display device 160 to display the content through the changed layout of the first object 202.

In operation 1303, the electronic device may identify whether a touch input corresponding to the content displayed on the display is detected. For example, the processor 120 may identify whether at least one touch input is detected through a region corresponding to content displayed on the display device 160.

In operation 1305, upon detecting the touch input corresponding to the content, the electronic device may identify whether a double-tap event is detected. For example, upon detecting a plurality of touch inputs continuously through the display region of the content, the processor 120 may determine that the double-tap event has occurred.

In operation 1307, upon the occurrence of the double-tap event, the electronic device may set a reference region for changing the size of the content based on a touch input corresponding to the content. For example, the processor 120 may set and store a touch point at which the double-tap event is detected, as the reference region for changing the size of the content.

In operation 1309, the electronic device may set the size of the second object corresponding to the content to a size of a virtual region in order to change the size of the content. For example, upon changing the size of the content, the processor 120 may increase the size of the second object 204 to the size of the virtual region to prevent a scroll from occurring in the second object 204. For example, the size of the virtual region may correspond to a size obtained by increasing a zoom magnification of the content included in the second object 204 to a maximum magnification.

In operation 1311, the electronic device may update the size of the content through the second object of which a size is set to the size of the virtual region. For example, the processor 120 may determine a size change type (e.g., zoom-in or zoom-out) and a change size of corresponding content based on the size of the content at a time at which the double-tap event has occurred. The processor 120 may update (e.g., zoom in or zoom out) the size of the content through the second object based on the size change type of the content. For example, the processor 120 may update the size of the content by updating the zoom magnification of the content on a reference interval basis.

In operation 1313, the electronic device may set a scroll variable based on a content reference region and a content size change. For example, the processor 120 may calculate a ratio for a position of the reference region against a height of the previous content 1120 of which a size is not yet decreased. The processor 120 may set the scroll variable based on a ratio for the position of the reference region and a height change value of the content.

In operation 1315, the electronic device may scroll the first object in accordance with the scroll variable. For example, upon changing the size of the content, the processor 120 may scroll the first object 202 to maintain visibility of the reference region of the content.

In operation 1317, the electronic device may update a size of a display region of the content in accordance with a change in the size of the content. For example, the processor 120 may change a layout of the first object 202 based on size information of the content changed in the second object 204. For example, the processor 120 may adjust the size of the display region corresponding to the second object 204, in the first object 202, in accordance with the size information of the content changed in the second object 204.

In operation 1319, the electronic device may compare the zoom magnification of the content and a reference magnification to identify whether the double-tap event is complete. For example, when the content zoom magnification to be changed on a reference interval basis is identical to the reference magnification, the processor 120 may determine that the double-tab event is complete. For example, the reference magnification may include a zoom magnification corresponding to a content change size which is set by the double-tab event.

When the zoom magnification of the content is different from the reference magnification, in operation 1311, the electronic device may additionally update the size of the content through the second object. For example, when the zoom magnification of the content is different from the reference magnification, the processor 120 may determine that the double-tap event is maintained. In operation 1311, the processor 120 may change the size of the content by updating the zoom magnification of the content on the reference interval basis.

In operation 1321, when the zoom magnification of the content is identical to the reference magnification, the electronic device may update the size of the second object in accordance with the size of the content. For example, when the zoom magnification of the content is identical to the reference magnification, the processor 120 may determine that the double-tap event is complete. Upon determining that the double-tap event is complete, similarly to operations 601 to 607 of FIG. 6, the processor 120 may re-set the size of the second object 204 in accordance with the updated size information of the content included in the second object 204 in a state where the display device 160 is indicated to display a captured screen.

Figure 14:
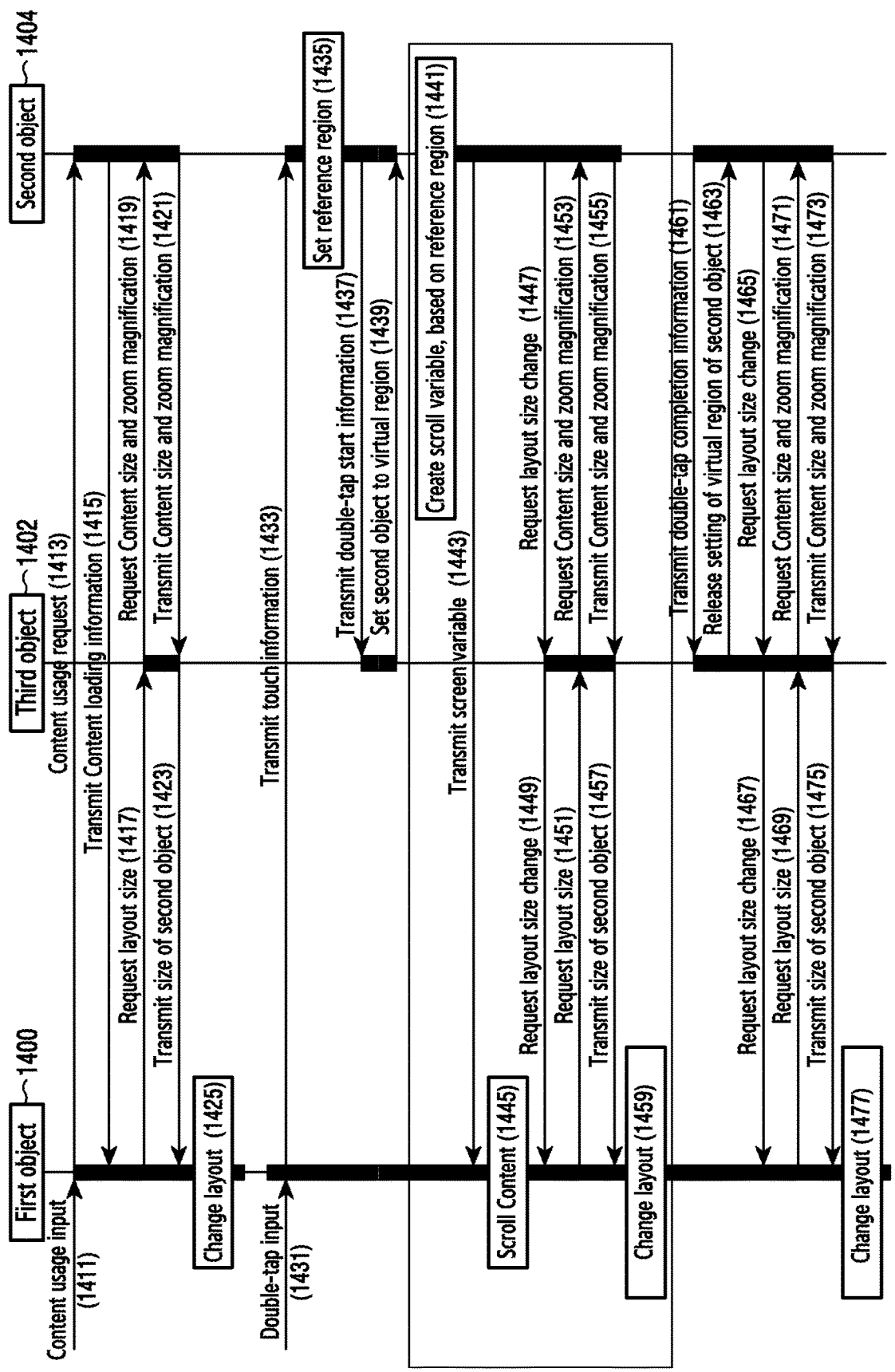
FIG. 14 illustrates a signal flow diagram for updating a size of content displayed on a display on a basis of a double-tap event in an electronic device according to various embodiments of the disclosure.

FIG. 14 illustrates a signal flow diagram for updating a size of content displayed on a display based on a double-tap event in an electronic device according to various embodiments of the disclosure.

Referring to FIG. 14, a first object 1400, a third object 1402, and a second object 1404 may be configured in a form of software or instructions used to display the content in the electronic device (e.g., the electronic device 101 of FIG. 1).

According to an embodiment, upon receiving a content usage input (see 1411), the first object 1400 (e.g., the first object 202 of FIG. 2A) may change a layout based on size information of content rendered through the second object 1404 (e.g., the second object 204 of FIG. 2A). For example, since operations (operations 1411 to 1425) for changing the layout of the first object 1400 in accordance with a size of the second object 1404 are identical to operations (operations 911 to 925) for changing the layout of the first object 900 in accordance with a size of the second object 904 in FIG. 9, detailed descriptions may be omitted.

According to an embodiment, upon changing a size of content based on a double-tap event, the first object 1200 may be scrolled in accordance with a change in the size of the content. For example, upon receiving a double-tap input (see 1431), the first object 1400 may transmit touch information (e.g., a touch point) corresponding to the double-tap input to the second object 1404 (see 1433). The second object 1404 may set and store a touch point at which the double-tap input is detected as a reference region (see 1435). The second object 1404 may transmit zoom start information to the third object 1402 (see 1437). The third object 1402 may set a size of the second object 1404 (see 1439) to a size of a virtual region in response to reception of the zoom start information. For example, the virtual region may include a size of a state in which content rendered in the second object 1404 are zoomed in with a maximum magnification. The second object 1404 may create a scroll variable based on a height change caused by the change in the size of the content and a ratio of a position of a reference region for the content based on a change in the size of the content (see 1441). For example, the ratio of the position of the reference region may include a ratio for a height of the reference region against a height of content at a time of receiving the double-tap input. The second object 1404 may transmit the scroll variable to the first object 1400 (see 1443). The first object 1400 may be scrolled in accordance with the scroll variable (see 1445).

According to an embodiment, when the size of the content is changed based on the double-tap event, the first object 1400 may change a layout in accordance with the change in the size of the content. For example, since operations (operations 1447 to 1459) for changing the layout of the first object 1400 in accordance with a size of the second object 1404 are identical to operations (operations 949 to 959) for changing the layout of the first object 900 in accordance with a size of the second object 904 in FIG. 9, detailed descriptions may be omitted.

According to an embodiment, the first object 1400, the third object 1402, and the second object 1404 may repeat operations (operations 1431 to 1459) for scrolling the first object 1400 and changing the layout while the double-tap event is maintained.

According to an embodiment, the second object 1404 may re-set the size of the second object 1404 in accordance with the size of the content in response to the completion of the double-tap event. For example, when a zoom magnification of the content is identical to a reference magnification which is set by the double-tap event, the second object 1404 may determine that the double-tap event is complete. Upon the completion of the double-tap event, the second object 1404 may transmit double-tap completion information to the third object 1402 (see 1461). The third object 1402 may release the setting of the virtual region of the second object 1404 in response to reception of the double-tap completion information (see 1463). The second object 1404 may re-set the size of the second object 1404 in accordance with the size of the content based on the release of the setting of the virtual region. For example, since operations (operations 1465 to 1477) for re-setting the size of the second object 1404 upon the completion of the double-table event are identical to operations (operation 965 to 977) for re-setting the size of the second object 904 in FIG. 9, detailed descriptions may be omitted. The first object 1400 may capture the first object 1400 and dispose it at an upper end of the first object 1400 while the size of the second object 1404 is re-set (operations 1465 to 1477), thereby preventing the screen from flickering due to the re-setting of the size of the second object 1404.

According to various embodiments of the disclosure, the electronic device may set the size of the second object to the size of the virtual region at a time of rendering content for the first time or at a time of calculating a height of the content.

According to various embodiments of the disclosure, a method of operating an electronic device includes displaying a user interface including web content on a touch screen display of the electronic device in such a manner that a second object including the web content is located in a first object, receiving a user input for zooming in or zooming out the web content with a first magnification, zooming in or zooming out the web content with the first magnification in the second object of a selected magnification that is greater than the first magnification, irrespective of the first magnification, upon receiving the user input, and adjusting the second object to have the first magnification after zooming in or zooming out the web content with the first magnification. The first object may be included in a first view class which allows the second object located in the first object to be scrolled on the touch screen display. The second object may be included in a second view class.

According to various embodiments, the selected magnification may be a maximum magnification.

According to various embodiments, the zooming in or zooming out the web content may include zooming in or zooming out the web content by using a third object of a third view class which plays an intermediary role between the first object and the second object.

According to various embodiments, the zooming in or zooming out of the web content may include providing a touch event from the first object to the second object, based on reception of the user input, providing, by the second object, the touch event to the third object, and setting, by the third object, the selected magnification for the second object.

According to various embodiments, the first view class and the second view class may be included in part of an Android operating system. The first view class may include a scroll view class. The second view class may include a web view class.

According to various embodiments, the adjusting with the first magnification may include capturing an image displayed with the first magnification after zooming in or zooming out the web content with the first magnification, and displaying the captured image while the second object is adjusted with the first magnification.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a touch screen display;
    at least one processor electrically coupled to the touch screen display; and
    a memory electrically coupled to the at least one processor,
    wherein the memory is configured to store a first object created through a first view class, a second object created through a second view class, and a third object created through a third view class, wherein the first object and the second object are scrollable and the third object is not scrollable, and
    wherein, the memory is further configured to store instructions that, when executed, cause the at least one processor to:
        display web content rendered in the second object through a display region which is set in the first object,
        receive a touch input for zooming in to or zooming out of the web content with a first magnification,
        when receiving the touch input, extend a size of the second object to a size of a virtual region to restrict occurrence of a scroll of the second object, based on setting of the third object, wherein the size of the virtual region is a maximum size supported in the second object and is irrespective of the first magnification of the touch input,
        zoom in to or zoom out of the web content with the first magnification in the second object having the size of the virtual region,
        update the display region set in the first object based on size information of the zoomed web content extracted from the second object and provided from the third object,
        identify whether the touch input is released from the touch screen display, and
        in response to the touch input being released from the touch screen display, re-set the size of the second object having the size of the virtual region in accordance with the size information of the zoomed web content based on setting of the third object.

2. The electronic device of claim 1, wherein the instructions, when executed, further cause the at least one processor to, in response to zooming in to or zooming out of the web content, use the third object included in the third view class to serve as an intermediary between the first object and the second object.

3. The electronic device of claim 2, wherein the instructions, when executed, further cause the at least one processor to:
    provide, by the first object, a touch event to the second object,
    provide, by the second object, the touch event to the third object, and
    set, by the third object, a selected magnification for the second object.

4. The electronic device of claim 1,
    wherein the first view class includes a scroll view class, and
    wherein the second view class includes a web view class.

5. The electronic device of claim 1, wherein the instructions, when executed, further cause the at least one processor to:
    capture an image displayed with the first magnification after zooming in to or zooming out of the web content with the first magnification, and
    display the captured image through the touch screen display while the size of the second object is re-set.

6. A method of operating an electronic device, the method comprising:
    displaying web content on a touch screen display of the electronic device through a display region set in a first object, wherein the web content is rendered in a second object;
    receiving a touch input for zooming in to or zooming out of the web content with a first magnification;
    when receiving the touch input, extending a size of the second object to a size of a virtual region to restrict occurrence of a scroll of the second object, based on setting of a third object, wherein the size of the virtual region is a maximum size supported in the second object and is irrespective of the first magnification of the touch input;
    zooming in to or zooming out of the web content with the first magnification in the second object having the size of the virtual region;
    updating the display region set in the first object based on size information of the zoomed web content extracted from the second object and provided from the third object;
    identifying whether the touch input is released from the touch screen display; and
    in response to the touch input being released from the touch screen display, re-setting the size of the second object having the size of the virtual region in accordance with the size information of the zoomed web content based on setting of the third object, wherein the first object is created through a first view class, the second object is created through a second view class, and the third object is created through a third view class, and wherein the first object and the second object are scrollable and the third object is not scrollable.

7. The method of claim 6, wherein the zooming in to or zooming out of the web content comprises zooming in to or zooming out of the web content by using the third object of the third view class to serve as an intermediary between the first object and the second object.

8. The method of claim 7, wherein the zooming in to or zooming out of the web content comprises:

providing a touch event from the first object to the second object, based on the receiving of the touch input;

providing, by the second object, the touch event to the third object; and setting, by the third object, a selected magnification for the second object.

9. The method of claim 6, wherein the first view class includes a scroll view class, and wherein the second view class includes a web view class.

10. The method of claim 6, wherein the re-setting of the size of the second object comprises:

capturing an image displayed with the first magnification after zooming in to or zooming out of the web content with the first magnification; and displaying the captured image while the second object is re-set.

11. An electronic device comprising:

a touch screen display;

a memory; and at least one processor coupled to the memory, wherein the memory is configured to store a first object created through a first view class, a second object created through a second view class, and a third object created through a third view class, wherein the first object and the second object are scrollable and the third object is not scrollable, and wherein the memory is further configured to store instructions that, when executed, cause the at least one processor to:

display content on the touch screen display through a display region set in the first object, wherein the content is rendered in the second object, receive a touch input for changing a size of the content with a first magnification, when receiving the touch input, extend a size of the second object to a size of a virtual region to restrict occurrence of a scroll of the second object, based on setting of the third object, wherein the size of the virtual region is a maximum size supported in the second object and is irrespective of the first magnification of the touch input, change the size of the content with the first magnification in the second object having the size of the virtual region, update the display region set in the first object based on changed size information of the content extracted from the second object and provided from the third object, identify whether the touch input is released from the touch screen display, and in response to the touch input being released from the touch screen display, re-set the size of the second object having the size of the virtual region in accordance with the changed size information of the content based on setting of the third object.

12. The electronic device of claim 11, wherein the instructions, when executed, further cause the at least one processor to scroll the first object based on the changed size information of the content.

13. The electronic device of claim 12, wherein the instructions, when executed, further cause the at least one processor to:

set a reference region for changing the size of the content based on the touch input, and scroll the first object based on the reference region and the changed size information of the content.

14. The electronic device of claim 12, wherein the instructions, when executed, further cause the at least one processor to, in response to the change in the size of the content, scroll the first object based on at least part of the changed size information of the content located outside of the re-set second object.

15. The electronic device of claim 11, wherein the instructions, when executed, further cause the at least one processor to:

capture a screen of the touch screen display upon completion of the changing of the size of the content, control the touch screen display to display the captured screen, and re-set the size of the second object based on the changed size information of the content in a state where the captured screen is displayed on the touch screen display.

16. The electronic device of claim 15, wherein the instructions, when executed, further cause the at least one processor to:

in response to completing the changing of the size of the content, capture at least part of the first object, and control the touch screen display to display the captured at least part of the first object at an upper end of the first object.

* * * * *